(12) United States Patent
Yanagisawa et al.

(10) Patent No.: US 7,190,664 B2
(45) Date of Patent: Mar. 13, 2007

(54) HIGH DENSITY OPTICAL RECORDING MEDIUM AND METHOD FOR REPRODUCING THEREOF

(75) Inventors: Takuma Yanagisawa, Tsurugashima (JP); Takayuki Nomoto, Tsurugashima (JP); Yasumitsu Wada, Tsurugashima (JP); Fumihiko Yokogawa, Tsurugashima (JP); Seiichi Ohsawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 647 days.

(21) Appl. No.: 10/257,719

(22) PCT Filed: Aug. 3, 2001

(86) PCT No.: PCT/JP01/06707

§ 371 (c)(1),
(2), (4) Date: Oct. 16, 2002

(87) PCT Pub. No.: WO02/15177

PCT Pub. Date: Feb. 21, 2002

(65) Prior Publication Data

US 2003/0099183 A1 May 29, 2003

(30) Foreign Application Priority Data

Aug. 11, 2000 (JP) .............................. 2000-244637

(51) Int. Cl.
*G11B 7/24* (2006.01)
(52) U.S. Cl. .................................. 369/275.4; 428/64.4
(58) Field of Classification Search ...................... None
See application file for complete search history.

(56) References Cited

U.S. PATENT DOCUMENTS

| 5,459,712 | A | * | 10/1995 | Sugaya et al. | ........... 369/275.4 |
| 5,883,879 | A | * | 3/1999 | Fukuoka et al. | ......... 369/275.4 |
| 6,023,451 | A | * | 2/2000 | Kashiwagi et al. | ...... 369/275.5 |
| 6,078,560 | A | * | 6/2000 | Kashiwagi | ............... 369/275.5 |
| 6,175,548 | B1 | * | 1/2001 | Kashiwagi | ............... 369/275.4 |
| 6,242,066 | B1 | * | 6/2001 | Yamasaki et al. | .......... 428/64.1 |
| 6,246,656 | B1 | * | 6/2001 | Kawakubo et al. | ...... 369/275.4 |
| 6,333,907 | B1 | * | 12/2001 | Iwata et al. | ............ 369/112.26 |
| 6,335,916 | B1 | * | 1/2002 | Endo et al. | ............... 369/275.4 |
| 6,512,735 | B1 | * | 1/2003 | Takeda et al. | ............ 369/275.4 |
| 6,611,492 | B2 | * | 8/2003 | Akimori et al. | ......... 369/275.4 |

FOREIGN PATENT DOCUMENTS

| EP | 0664 541 | | 7/1995 | |
| EP | 1 100 079 | | 5/2001 | |
| JP | 07-210872 | | 8/1995 | |
| JP | 2000-011452 | * | 1/2000 | .............. 369/275.4 |
| JP | 2000-11453 | | 1/2000 | |
| JP | 2000-011453 | | 1/2000 | |

* cited by examiner

Primary Examiner—Tan Dinh
(74) Attorney, Agent, or Firm—Drinker Biddle & Reath LLP

(57) ABSTRACT

An optical disc includes an information recording layer having a record of information as a pit train with a predetermined track pitch and a light-transmissive layer formed on the information recording layer so that the information can be reproduced by a beam of light illuminated through the light-transmissive layer to the information recording layer by an objective lens. The optical disc includes a feature in that a relationship of $0.194(\lambda/NA)^2 \leq TP \times Tmin \leq 0.264(\lambda/NA)^2$ is satisfied, provided that the track pitch is TP, a pit shortest length is Tmin, a wavelength of the light beam is $\lambda$ and a numerical aperture of the objective lens is NA. The optical disc also includes a feature in that a pit width is 120 nm or smaller in a range of a track pitch of 0.280 to 0.325 µm.

6 Claims, 25 Drawing Sheets

HIGH DENSITY OPTICAL RECORDING MEDIUM AND METHOD FOR REPRODUCING THEREOF

TECHNICAL FIELD

The present invention relates to an optical disc having a record of information in the form of a pit train, and to an information reproducing apparatus for mounting such an optical disc thereon to reproduce the information out of the same by the use of a beam of light.

BACKGROUND ART

Conventionally, DVD (Digital Versatile Disc) has been developed as an optical disc having a dense record of information. The DVD can afford to record the data of 2.6 MB on one surface of an optical disc by illuminating a beam of light having a wavelength of 650 nm onto the disc through an optical system having a numerical aperture NA of 0.6. The DVD is capable of recording video signals of nearly one home on one surface thereof.

In the meanwhile, the home-use video tape recorder has a basic recording time of nearly two hours. In order to secure the handling equivalent to the video tape recorder on the optical disc and player or information reproducing apparatus, there is a need for the optical disc to record much more data. Meanwhile, in order to make feasible the process such as editing by making the most of a random access function and the like as the features of the optical disc, there is a necessity of recording video signals of nearly three hours.

Furthermore, there is a demand for a high-density reproducing exclusive optical disc in the marketplace. The transfer rate for the digital HDTV (digital high definition television) offered by BS (broadcasting satellite) digital television broadcast is expected 20 to 24 Mbps. The recording of digital HDTV video signals in an amount of one movie, e.g. about two hours and half or 150 minutes, requires 22.5 to 27 GB=(20 –25 Mbps)/8(bits)/1000×150(min.)×60(sec.). Basically, the reproducing capability of an information reproducing apparatus is determined by NA/$\lambda$ by using an objective lens NA and a read-out beam wavelength $\lambda$. It is accordingly possible to improve the optical-disc recording/reproducing density by increasing the NA and decreasing the $\lambda$. The current DVD uses an optical disc system employs $\lambda$=650 nm and NA=0.6, and a light-transmissive layer with 0.6 mm thick between the most outer surface and the reflection recording surface of the information recording layer of the optical disc.

For example, Japanese Patent No. 2,704,107 discloses an optical disc having a track pitch of (0.72–0.8)×$\lambda$/NA/1.14 μm, a pit width or upper width of (0.3–0.45)×$\lambda$/NA/1.14 μm and a pit bottom width or lower width of (0.2–0.25)×$\lambda$/NA/1.14 μm provided that a reproducing beam wavelength of $\lambda$[μm] and an objective lens numerical aperture is NA. With such an optical disc, the crosstalk between the adjacent tracks is suppressed in amount by selecting a particular pit form within the above range of track pitch.

In this related art, when determining a track pitch and a pit width, as shown in FIG. 1, a pit train of a single frequency is assumed to estimate as a crosstalk a signal amplitude of a basic frequency component in a photodetector output signal obtained when the reproducing light spot scans a point deviated a constant amount from a track center.

In order to record data with further density, the particular pit form of the related-art disc if simply converted on the assumption, for example, of $\lambda$=405 nm and NA=0.85 provides a track pitch TP of 0.301 to 0.334 μm, a pit upper width Wm of 125 to 188 nm and a pit lower width Wi of 80 to 100 nm. If the optical disc as defined by such related art is reproduced, the relationship between the track pitch and the pit width deviates from an optimal value. This results in a problem that the crosstalk signal amplitude and main signal amplitude representative of superiority/inferiority in RF signal characteristic exceeds −9 dB that is not practically problematic, thus making impossible to secure a sufficient system margin.

DISCLOSURE OF INVENTION

Accordingly, the present invention has been made by taking into account the foregoing point. It is an object of the present invention to provide a next-generation optical disc and information reproducing apparatus capable of recording data with higher density as compared to the conventional DVD by the use of a reproducing beam of light having a shorter wavelength and an optical system having a higher numerical aperture.

An optical disc according to the present invention is an optical disc comprising an information recording layer having a record of information as a pit train with a predetermined track pitch and a light-transmissive layer formed on the information recording layer so that the information is to be reproduced by a beam of light illuminated through the light-transmissive layer to the information recording layer by an objective lens, wherein a relationship of $0.194 (\lambda/NA)^2 \leq TP \times Tmin \leq 0.264 (\lambda/NA)^2$ is satisfied provided that the track pitch is TP, a pit shortest length is Tmin, a wavelength of the light beam is $\lambda$ and a numerical aperture of the objective lens is NA, a pit width being 120 nm or smaller in a range of a track pitch of 0.280 to 0.325 μm.

In one aspect of the recording medium according to the invention, a bottom width of the pit is 40 nm or greater.

In another aspect of the recording medium according to the invention, the light beam has a wavelength $\lambda$ of 400 to 415 nm and said objective lens has a numerical aperture NA of from 0.78 to 0.86.

An optical-disc information reproducing apparatus according to the invention is an information reproducing apparatus comprising: means for rotatably supporting an optical disc having an information recording layer having a record of information as a pit train with a predetermined track pitch and a light-transmissive layer formed on the information recording layer; a light source for emitting a beam of light; an objective lens for focusing the light beam toward the information recording layer through the light-transmissive layer of the optical disc; an illuminating optical system for guiding the light beam to the objective lens; and a detecting optical system including light detecting means to guide a reflection light from the information recording layer to the light detecting means through the objective lens; means for reproducing information recorded on the optical disc on the basis of an output from the light detecting means; wherein the optical disc is satisfied by a relationship of $0.194 (\lambda/NA)^2 \leq TP \times Tmin \leq 0.264 (\lambda/NA)^2$ provided that the track pitch is TP, a pit shortest length is Tmin, a wavelength of the light beam is $\lambda$ and a numerical aperture of the objective lens is NA, a pit width being 120 nm or smaller in a range of a track pitch of 0.280 to 0.325 μm.

In one aspect of the information reproducing apparatus according to the invention, a bottom width of the pit is 40 nm or greater.

In another aspect of the information reproducing apparatus according to the invention, said light source is a blue semiconductor laser having a wavelength λ of 400 to 415 nm, and said objective lens has a numerical aperture NA of from 0.78 to 0.86.

In order to solve the foregoing problem, the present inventor has devised a proper evaluation method as a system in the vicinity of λ=405 nm and of NA=0.85 and found by using same a range of track pitch and a pit width for further stabilization as an optical disc system. As a result, it has been found that the track pitch should be provided within a range of 0.280 to 0.325 μm and the pit width be 120 nm or smaller. Such an optical disc if reproduced provides a value of crosstalk-signal-amplitude/main-signal-amplitude, which is representative of superiority/inferiority in RF signal characteristic, of −9 dB or below that there is no practical problem, thereby realizing a stable system.

BEST MODE FOR CARRYING OUT THE INVENTION

First explained is the basic way of thinking on the present invention. The present inventor has manufactured an optical disc by making the most of an electronic beam recorder (hereinafter abbreviated as EBR) in order to fabricate a pit with a narrow width (Y. kojima, H. Kitahara, O. Kasono, M. Katsumura and Y. Wada: "High Density Electron Beam", Jpn. J. Appl. Phys. 37 (1998) p2137–2143). Also, an optimal track pitch and a pit width for an optical disc system of the invention have been determined by optical simulation.

The comma aberration $W_{31}$, occurring in the presence of an optical disc tilt, is given by the following formula:

$$W_{31} = \frac{(n^2 - 1) \cdot Dth \cdot (NA)^3}{2n^3 \lambda} \cdot Dti$$

Herein, n is a refractive index of an optical disc substrate, Dth is a thickness of the optical disc substrate, NA is a numerical aperture, Dti is a disc tilt angle and λ is a wavelength of a beam of light.

In the conventional DVD, the substrate thickness through which the reproducing light beam transmits is 0.6 mm. Consequently, a system reproducing margin has been determined by a tilt of the optical disc relative to an optical beam axis, particularly by a comma aberration caused by a tilt in the radial direction. For a system the most strict in radial tilt characteristic, the track pitch and pit width must have been optimized to sufficiently decrease the crosstalk.

Figure 1:
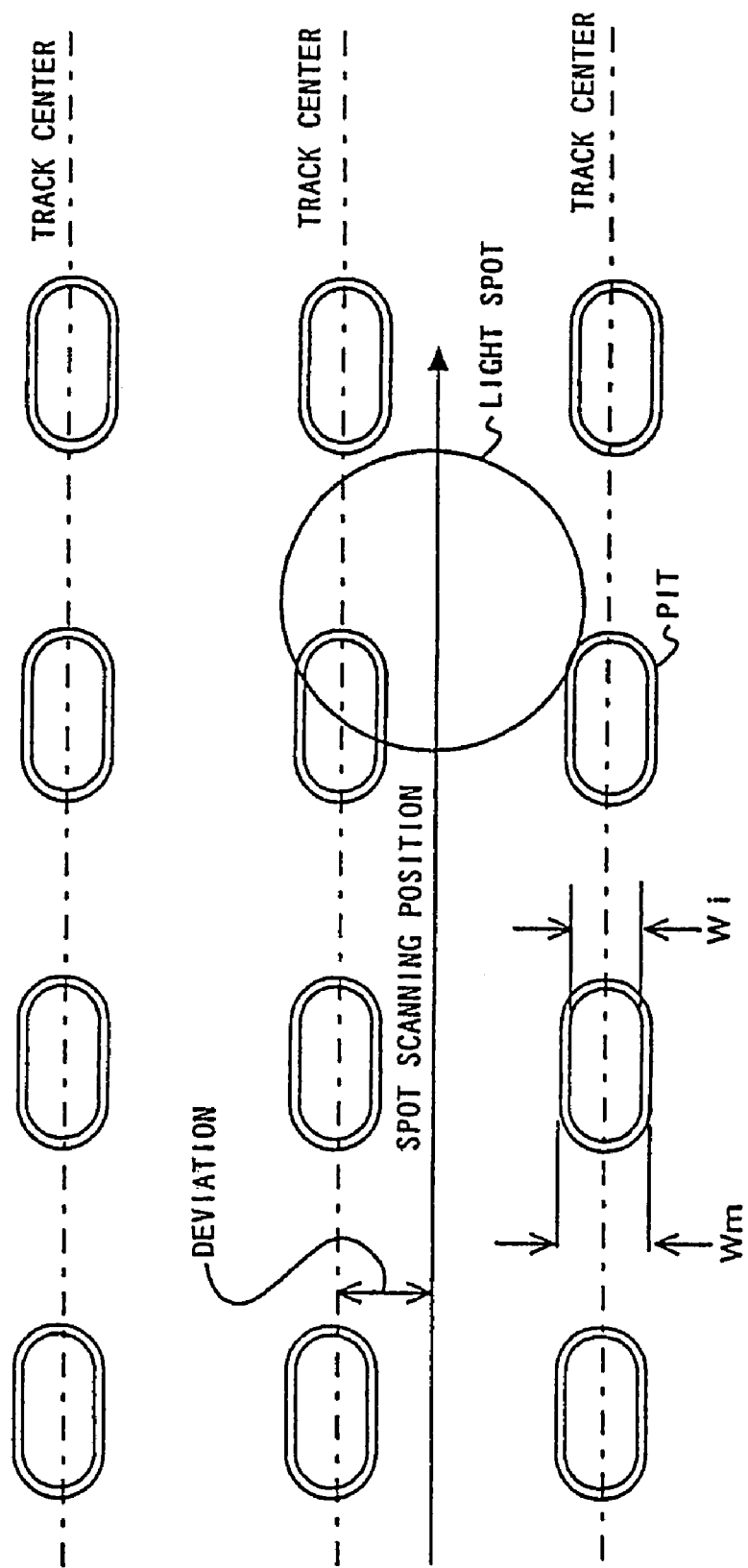
FIG. 1 is a typical view showing a pit arrangement on an optical disc used to evaluate the crosstalk between the adjacent tracks in the related art.
Figure 2:
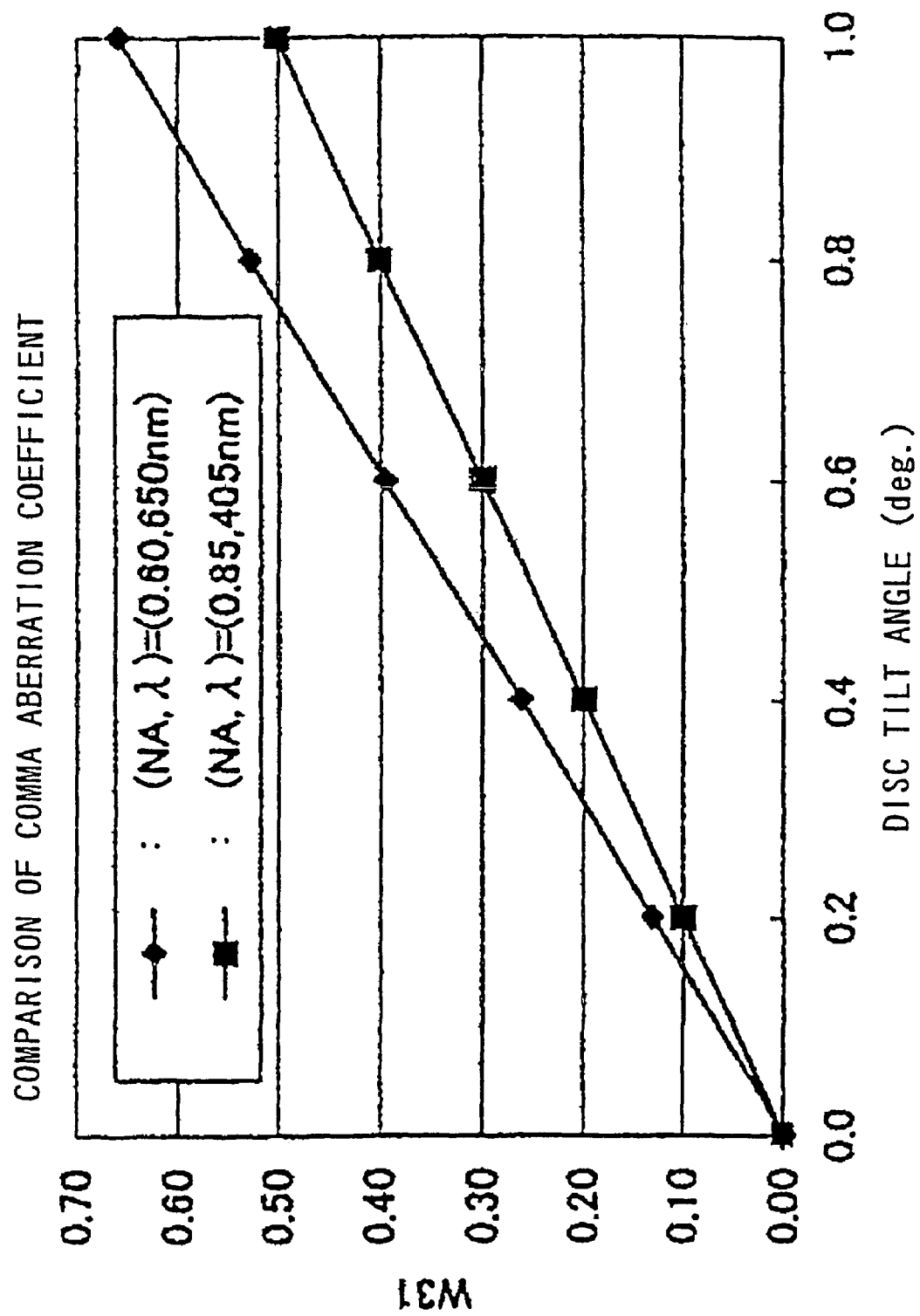
FIG. 2 is a graph showing a change of a comma aberration coefficient caused due to an optical disc tilt.

In an optical disc system of the invention, if the comma aberration is considered that is caused due to optical disc tilt, when a thickness of light transmissive layer of 0.1 mm is used as shown in FIG. 2, there is a decrease in comma aberration $W_{31}$ caused due to an optical disc tilt as compared between an optical disc (NA, λ)=(0.85, 405 nm) in the present case and a conventional DVD (NA, λ)=(0.60, 650 nm).

On the other hand, the wavefront aberration in defocusing is given by the following formula:

$$W_{20} = \frac{1 - \sqrt{1 - (NA)^2}}{\lambda} \cdot Ddef$$

Figure 3:
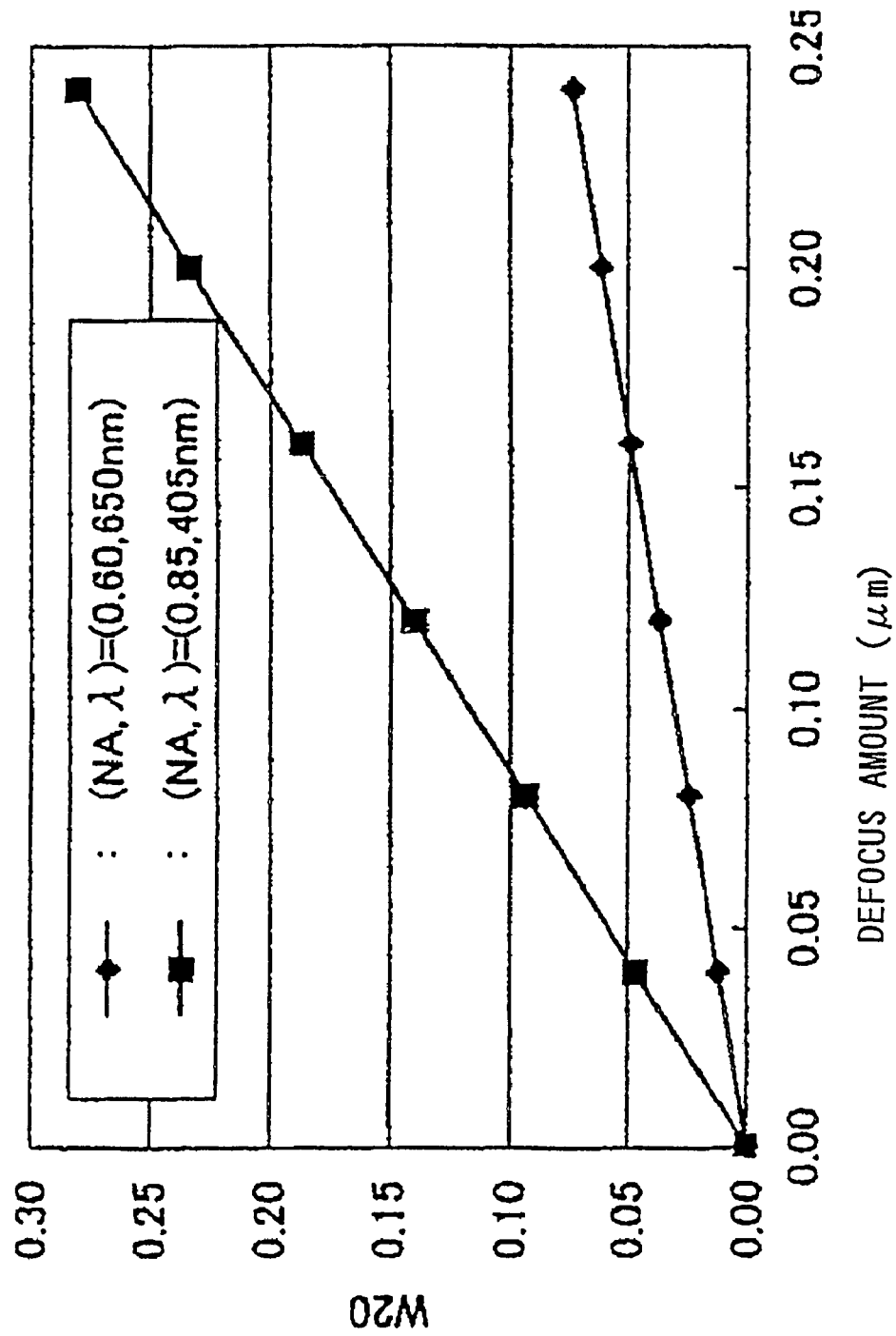
FIG. 3 is a graph showing a change of a wavefront aberration coefficient relying upon a defocus amount in the optical disc.

As can be seen from the above formula, the aberration amount $W_{20}$ caused due to the same amount of defocusing Ddef is increased to about 3.8 times the value of the conventional DVD (NA, λ)=(0.60, 650 nm) (see FIG. 3) by providing the optical disc in this time with (NA, λ)=(0.85, 405 nm). That is, in the optical disc system of the present invention, the defocusing characteristic determines a system reproducing margin. In defocusing, there is increase of crosstalk and increase of inter-symbol interference as well (to be interpreted as a tangential crosstalk). Consequently, the optical disc system strict in defocus characteristic requires optimizations of a track pitch and a pit width in order to sufficiently reduce a crosstalk and at the same time an inter-symbol interference.

Usually, inter-symbol interference can be suppressed by increasing a main signal amplitude.

Figure 4:
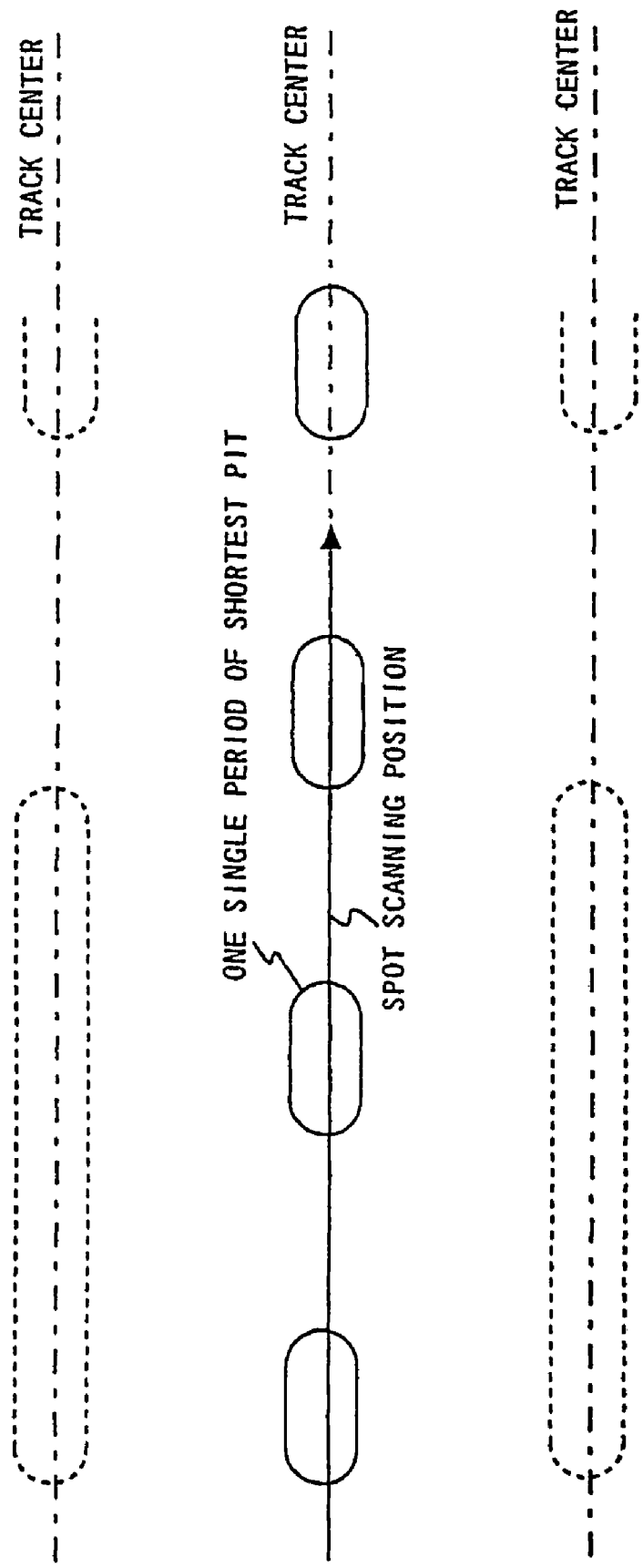
FIG. 4 is a typical plan view showing a pit arrangement that pits having the shortest pit length are arranged with a single period on the track on the optical disc used to compute main and crosstalk signals in an evaluation amount of crosstalk-signal-amplitude/main-signal-amplitude according to the invention.
Figure 5:
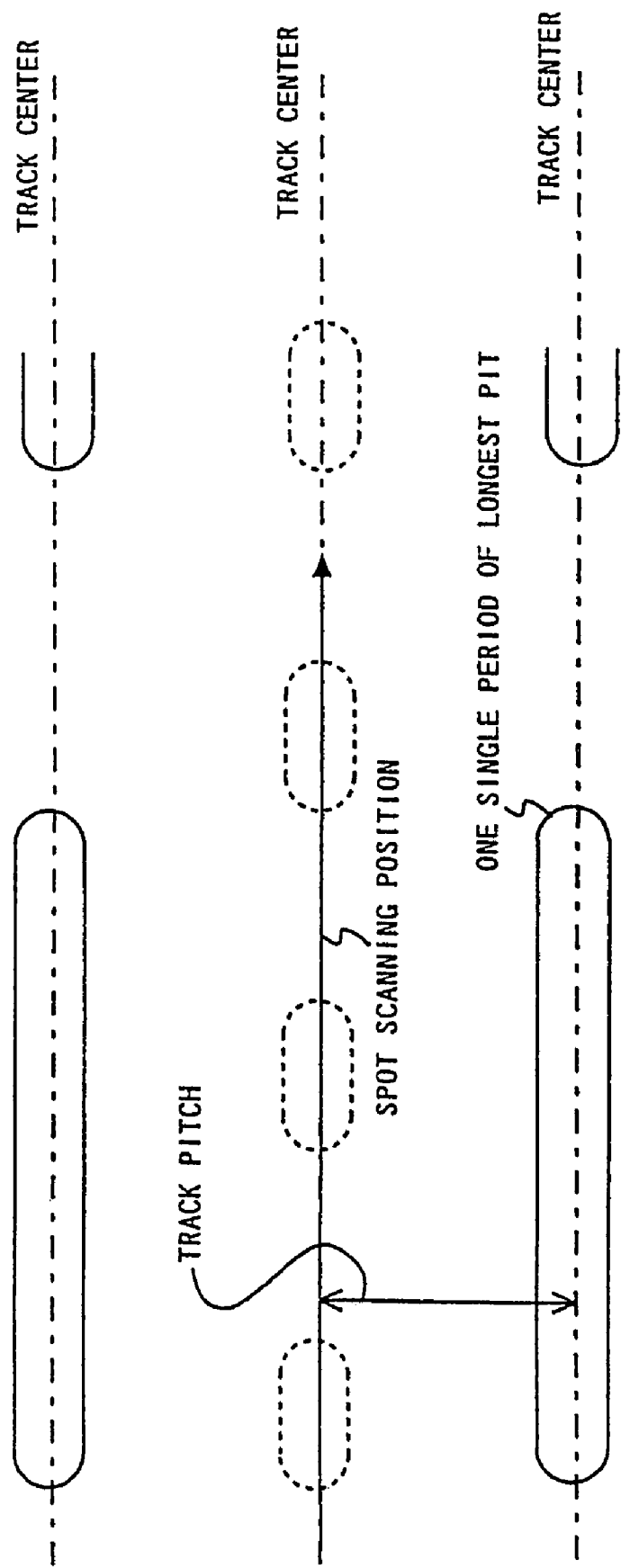
FIG. 5 is a typical plan view showing a pit arrangement that pits having the longest pit length are arranged with a single period on the track on the optical disc used to compute main and crosstalk signals in an evaluation amount of crosstalk-signal-amplitude/main-signal-amplitude according to the invention.

Accordingly, the present invention has set up a computation model for determining a track pitch and a pit width, as follows:

(1) the condition that the product of a track pitch TP and a shortest pit length Tmin is constant (i.e. recording density constant) (hereinafter described simply as TP×Tmin) is added;

(2) evaluated value is given not as a signal amplitude obtained from the reproducing light spot shifted from a track center to a between-track point but as crosstalk-signal-amplitude/main-signal-amplitude;

(3) to compute a main signal, a value is used that the pits shortest in pit length are arranged with a single period on the track as shown in FIG. 4. This is because this is a severe condition that inter-symbol interference is ready to occur in the highest possibility. Meanwhile, to compute a crosstalk signal, a value is used that the pits longest in pit length are arranged with a single period on the track as shown in FIG. 5. This is because this is a severe condition that crosstalk is ready to occur in the highest possibility. A crosstalk signal amplitude is given as a signal amplitude when the reproducing beam scans a point distant just by a track pitch from an on-track point. In addition, the pit sectional form is provided with a slant-surface width of 0 in its side surface, i.e. an inclination of 90 degrees from the top surface to bottom surface. The case having a slant-surface angle in the pit section is described later.

Using this model, a simulation of a change in crosstalk-signal-amplitude/main-signal-amplitude (dB) have been conducted under conditions changing the track pitch (μm) and the pit width (nm) in the case of (NA, λ)=(0.85, 405 nm) and TP×Tmin=0.044 μm², and then the ranges of track pitch and a pit width are determined have been evaluated. The value of TP×Tmin=0.044 μm² intends to be recordable of the data of about 27 GB to an optical disc having a diameter of 12 cm under the modulation (1, 7) RLL. This is a sufficient density for recording HDTV video images in an amount of 2 hours and 30 minutes, as described before.

Figure 6:
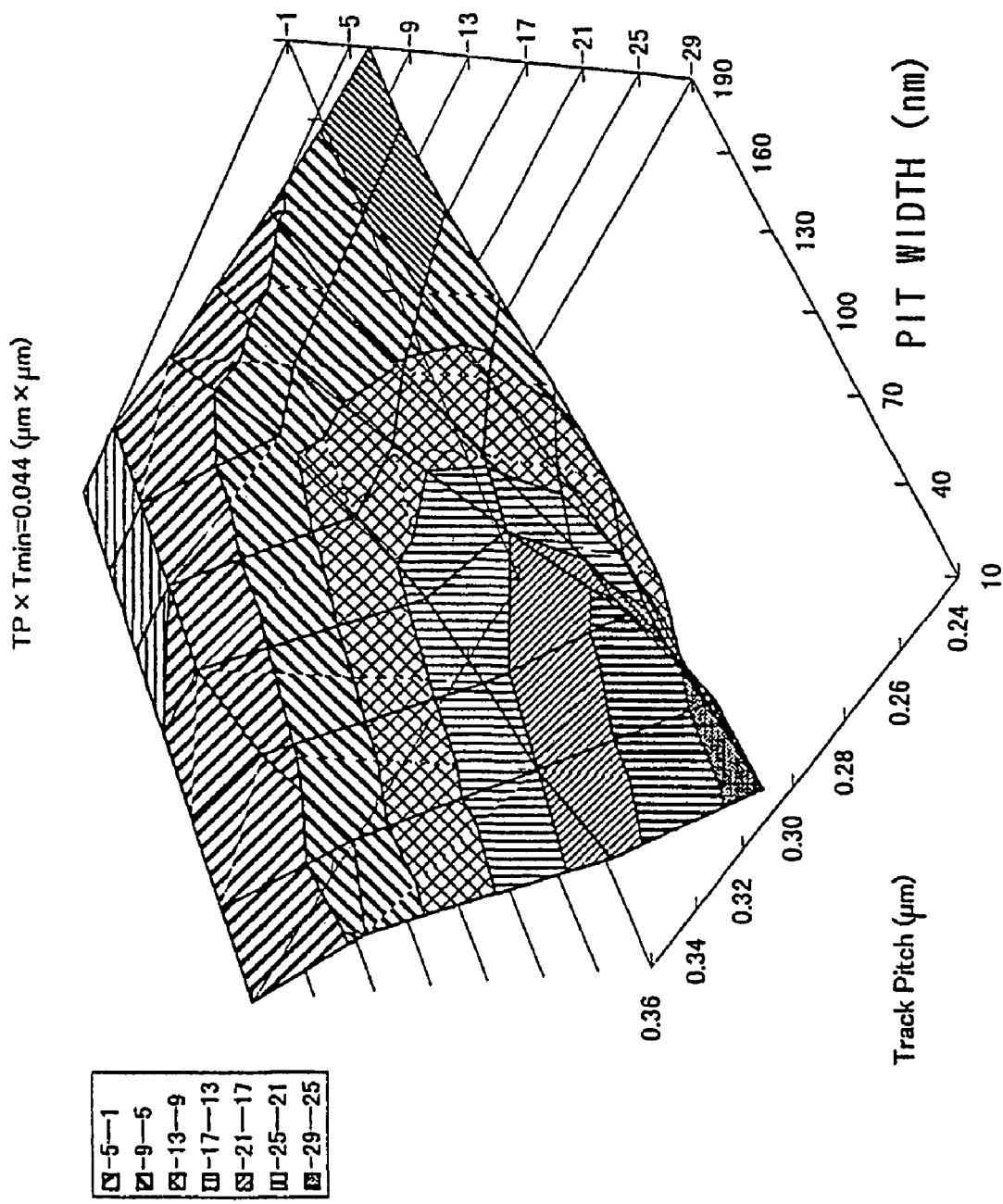
FIG. 6 is a three-dimensional graph in the case of a product of a track pitch TP and a shortest pit length Tmin of 0.044 μm², showing a change of a value of crosstalk-signal-amplitude/main-signal-amplitude when changing the track pitch and the pit width.

A result of the simulation is shown in the three-dimensional graph of FIG. 6. As apparent from the figure, a distribution representative of a bottom value can be confirmed in the vicinity of a track pitch of 0.3 μm and of a pit width of 10 to 40 nm in the range of a track pitch of 0.24 to 0.36 μm and of a pit width of 10 to 190 nm.

Figure 7:
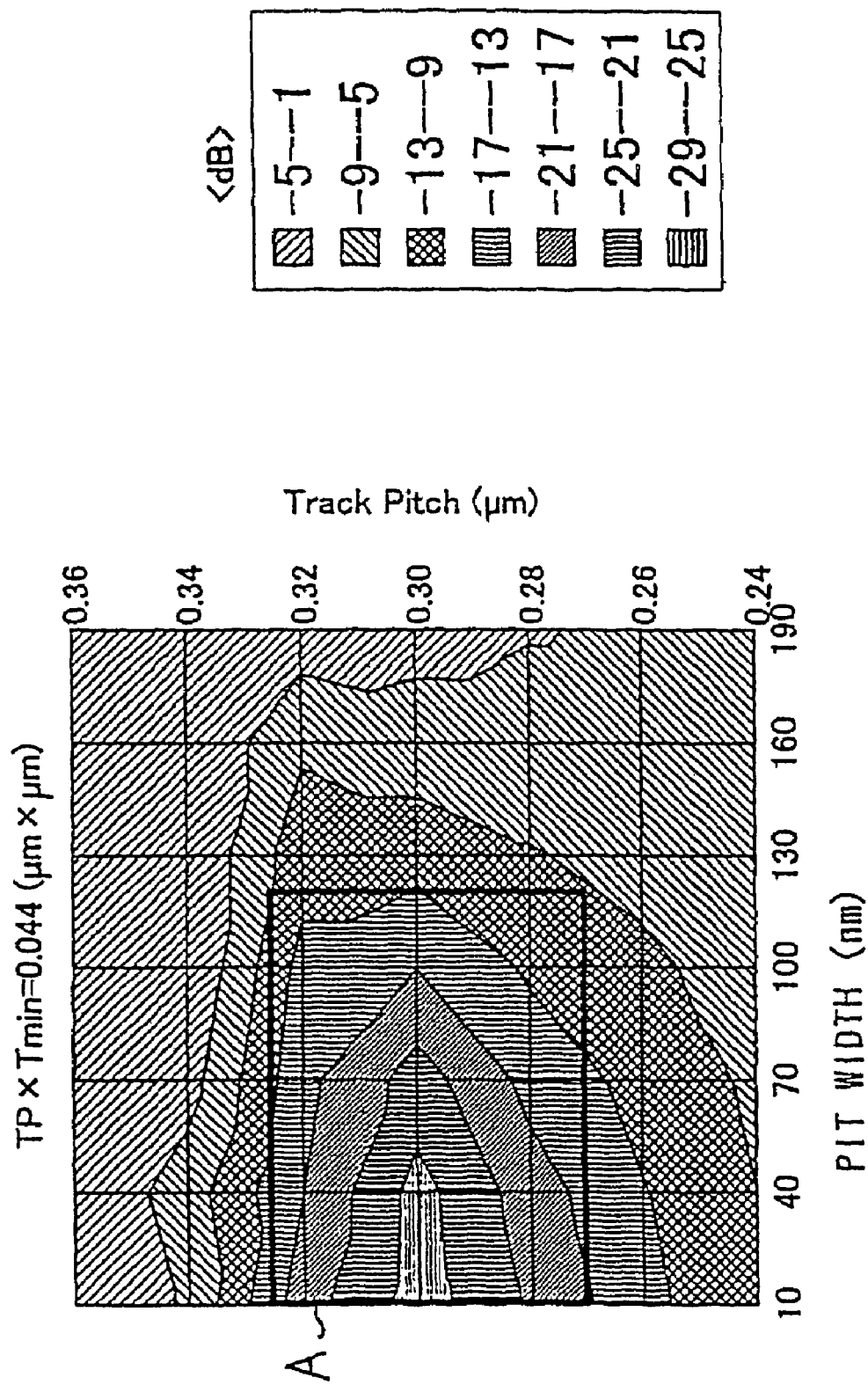
FIG. 7 is a two-dimensional graph corresponding to FIG. 6.

Similarly, FIG. 7 shows a contour-line graph by the simulation result. It is to be considered that there are almost no practical problem where the crosstalk-signal-amplitude/main-signal-amplitude is −8 to −9 dB or below (the crosstalk signal is about one-third or below of the main signal). The pit width if greater is generally advantageous for S/N suppression because of capability of taking the main-signal absolute amplitude great. The track pitch if wider is advantageous for tracking servo system. That is, it is desired in FIG. 7 to provide a crosstalk-signal-amplitude/main-signal-amplitude of −9 dB or below and further in an area of as upper right as possible.

As apparent from the above discussion, if selecting a track pitch and a pit width free from any practical problem, the area within the bold square at A in FIG. 7 is obtained, i.e. a range of a track pitch of 0.27 to 0.325 μm and of a pit width of 120 μm or less.

Next, confirmative computation was made on the case of increasing the value TP×Tmin (i.e. decreasing the recording capacity).

Figure 8:
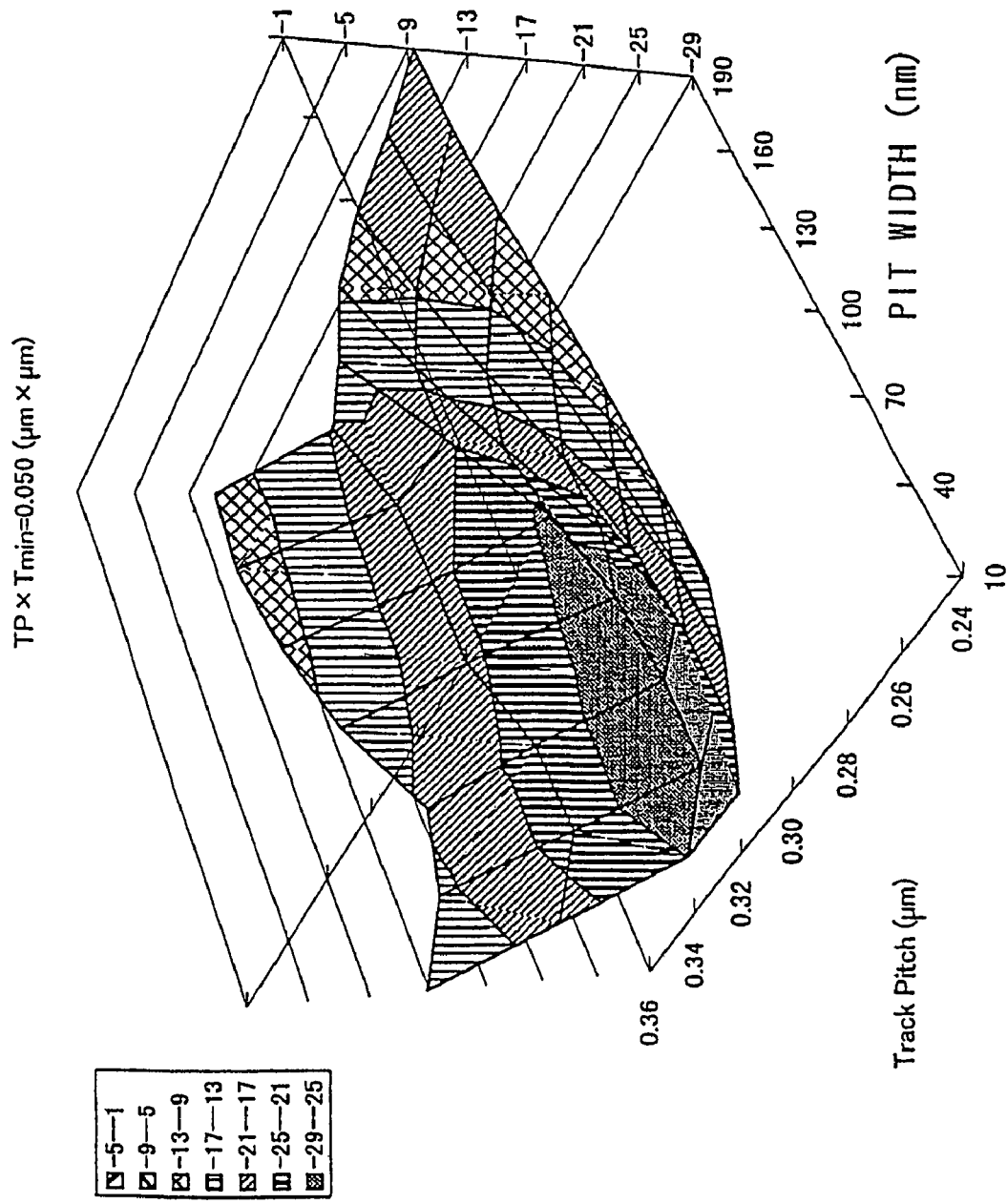
FIG. 8 is a three-dimensional graph in the case of a product of a track pitch TP and a shortest pit length Tmin of 0.050 μm², showing a change of a value of crosstalk-signal-amplitude/main-signal-amplitude when changing the track pitch and the pit width.
Figure 9:
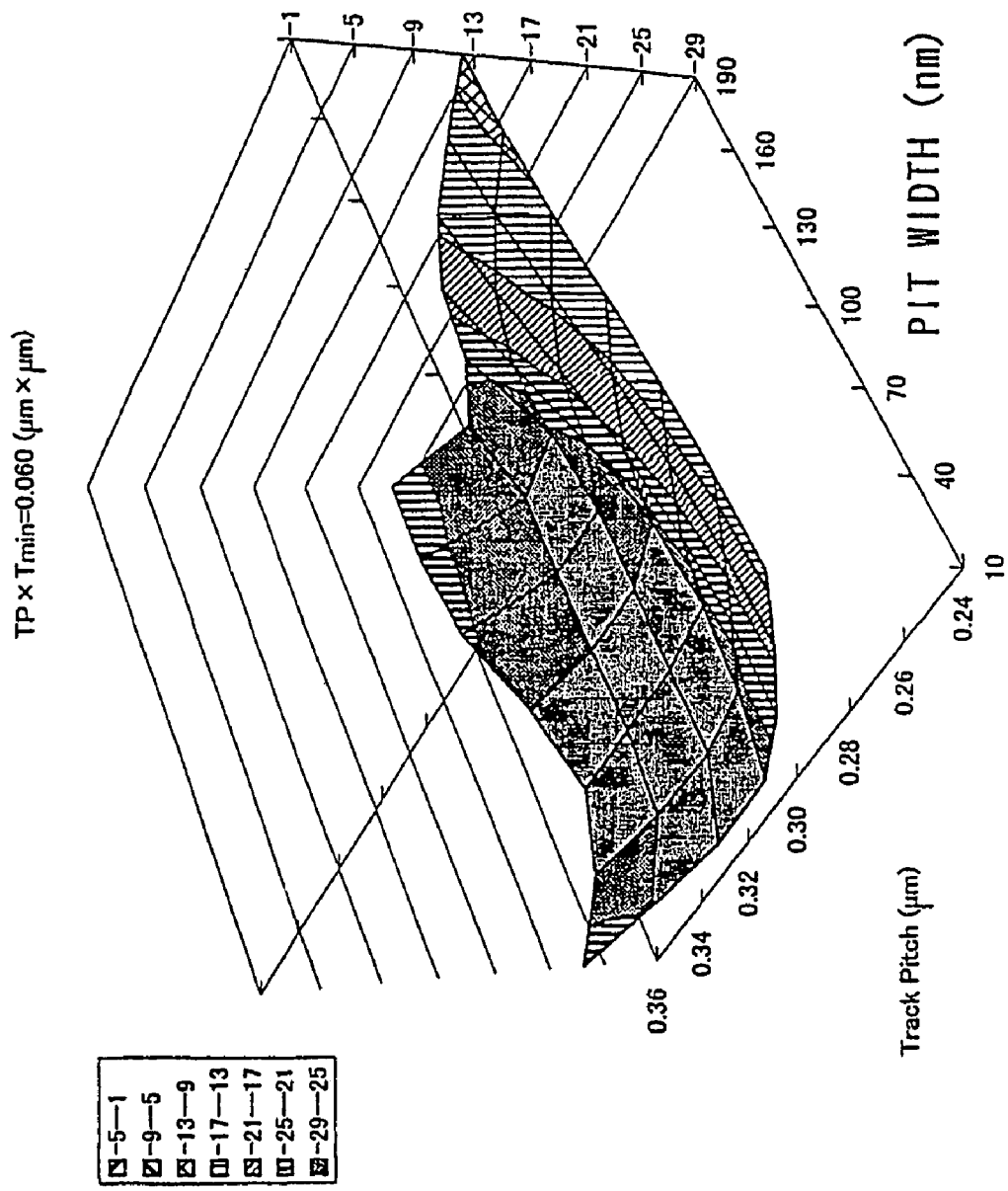
FIG. 9 is a three-dimensional graph in the case of a product of a track pitch TP and a shortest pit length Tmin of 0.060 μm², showing a change of a value of crosstalk-signal-amplitude/main-signal-amplitude when changing the track pitch and the pit width.
Figure 10:
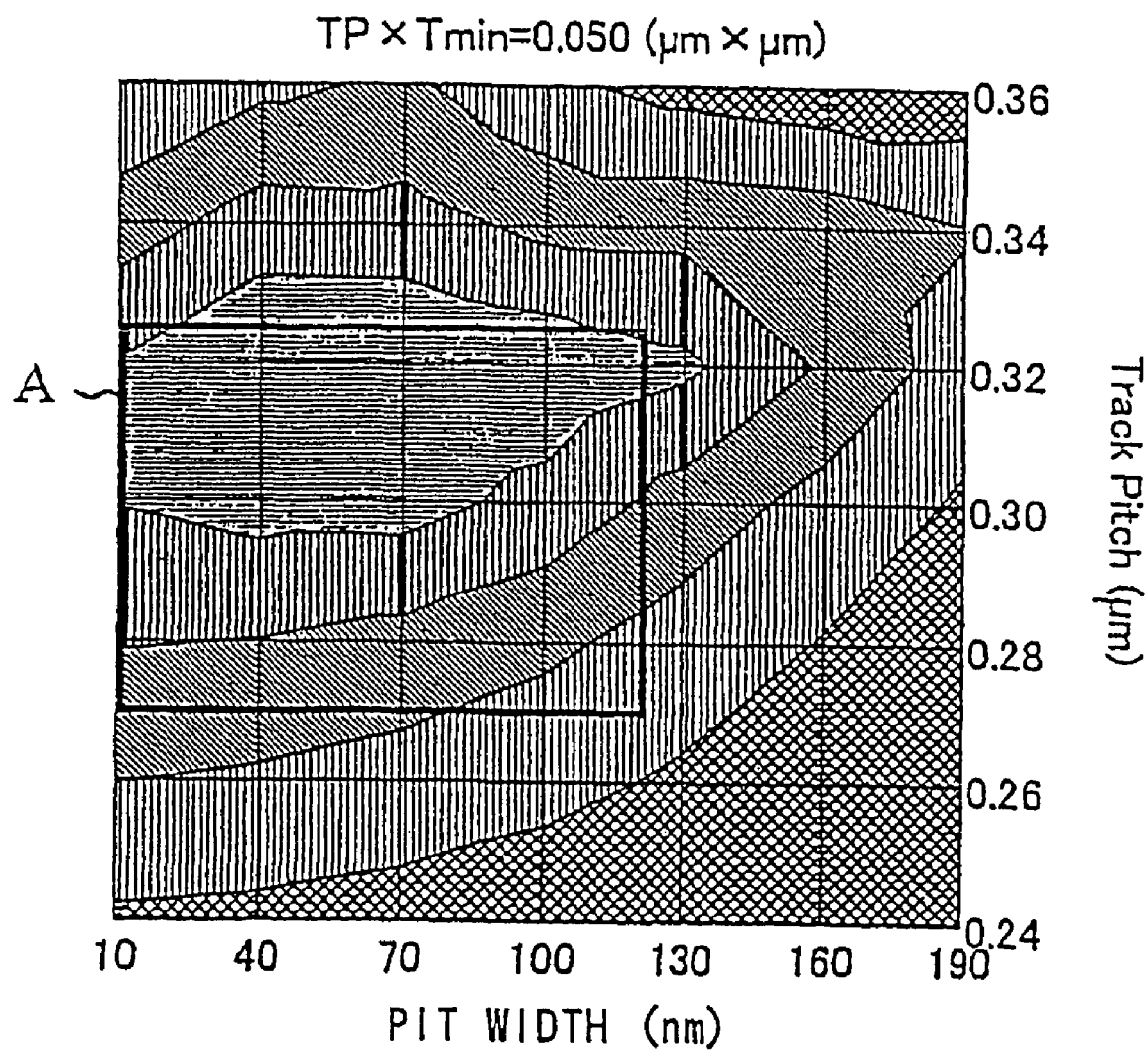
FIG. 10 is a two-dimensional graph corresponding to FIG. 8.
Figure 11:
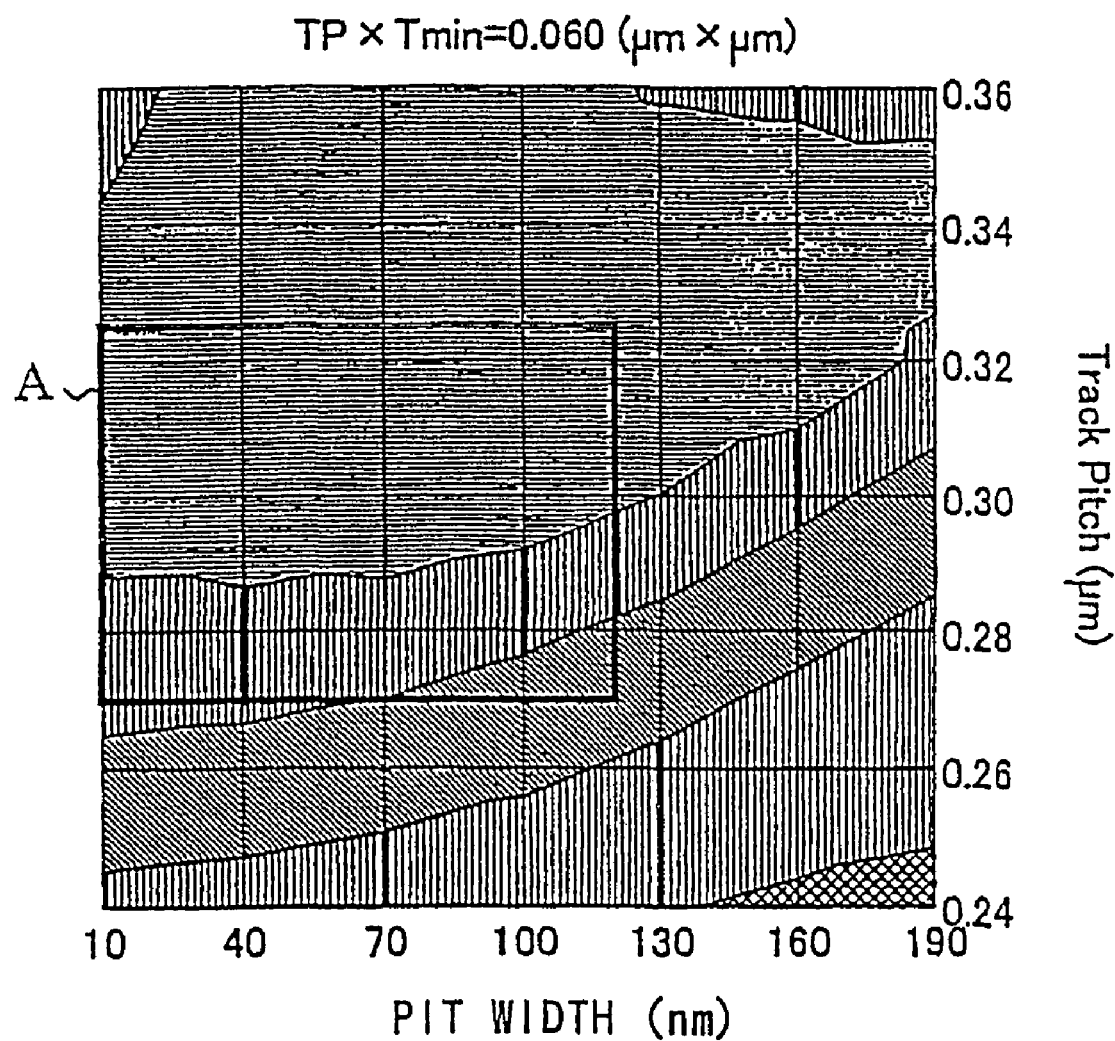
FIG. 11 is a two-dimensional graph corresponding to FIG. 9.

The simulation results, where values TP×Tmin are 0.050 μm² and 0.060 μm², are respectively shown in the three-dimensional graphs of FIGS. 8 and 9. From these three-dimensional graphs, it can be seen that spread is the distribution in the ranges of track pitch and pit width that is low in the value of crosstalk-signal-amplitude/main-signal-amplitude. Similarly, as apparent from the contour-line graphs of FIGS. 10 and 11 corresponding respectively to FIGS. 8 and 9, it can be seen that, even if the value TP×Tmin is increased, the value of crosstalk-signal-amplitude/main-signal-amplitude can be kept small within the bold line at A in FIGS. 10 and 11, i.e. within a range of a track pitch of 0.27 to 0.325 μm and a range of a pit width of 120 μm or smaller. That is, it can be understood that there is no problem at all in increasing TP×Tmin (i.e. when decreasing the recording capacity) if limited to a selection range when TP×Tmin=0.044 μm² (corresponding to a recording capacity of 27 GB).

Herein, by expressing the value of TP×Tmin by using (λ/NA)², the range of TP×Tmin of from 0.44 μm² to 0.060 μm² is given as a range of 0.194 (λ/NA)² to 0.264 (λ/NA)².

As apparent from the above discussion, for a value of TP×Tmin of 0.194 (λ/NA)² to 0.264 (λ/NA)², the crosstalk and inter-symbol interference can be suppressed to such a small extent that there is no practical problem by providing a track pitch range of 0.270 to 0.325 μm and a pit width range of 120 nm or smaller. The above range, if using (1, 7) RLL modulation, corresponds to a data record of approximately 27.1 to 19.9 GB in an optical disc having a diameter of 12 cm.

Next, consideration was made on the effect in changing the numerical aperture NA and light beam wavelength λ. On this occasion, TP×Tmin was given 0.194 (λ/NA)² as the most strict condition in the above consideration.

Figure 12:
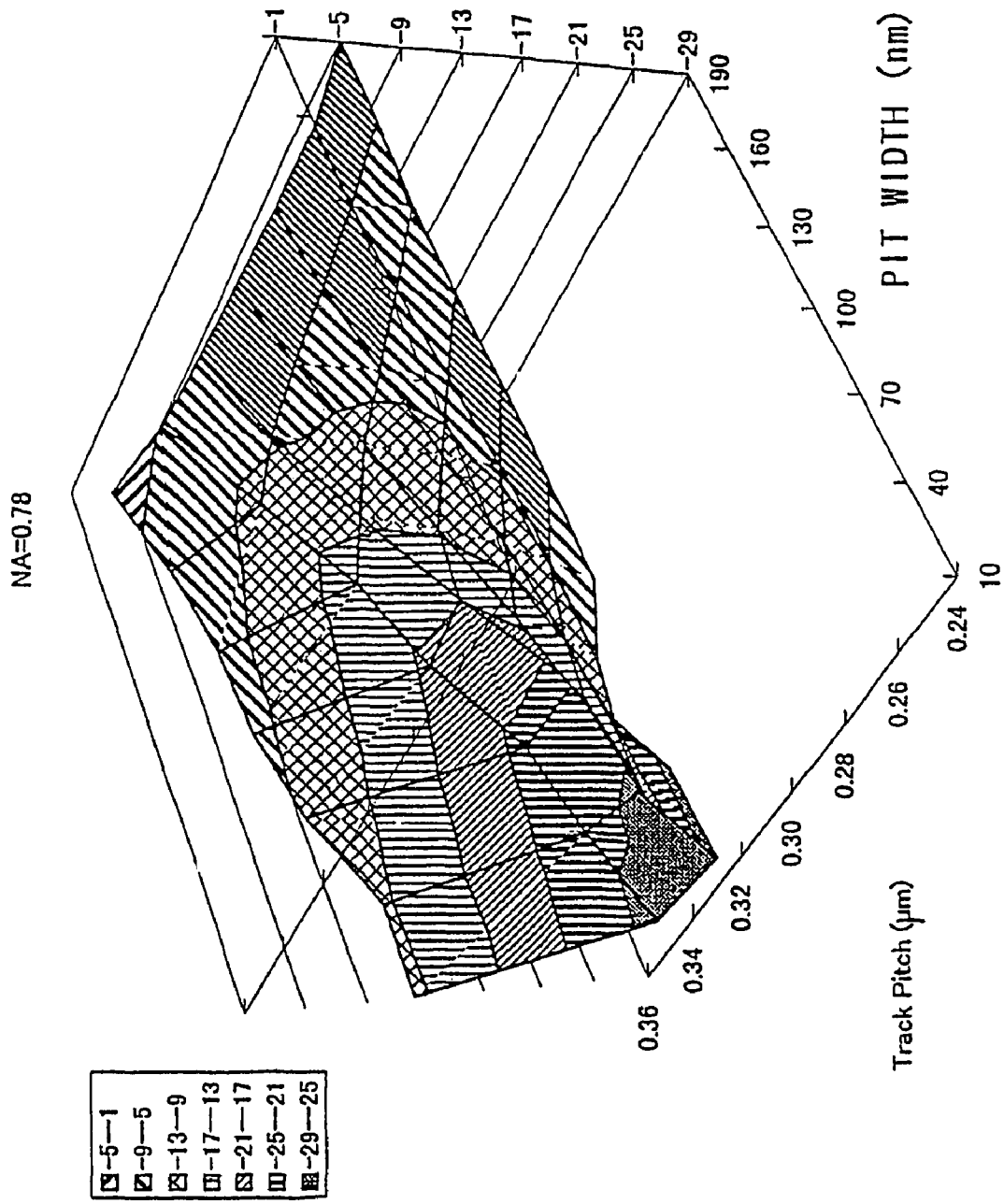
FIG. 12 is a three-dimensional graph showing a change of a value of crosstalk-signal-amplitude/main-signal-amplitude when the numerical aperture is respectively given 0.78 in the case of a product of track pitch TP and shortest pit length Tmin of 0.194 (λ/NA)².
Figure 13:
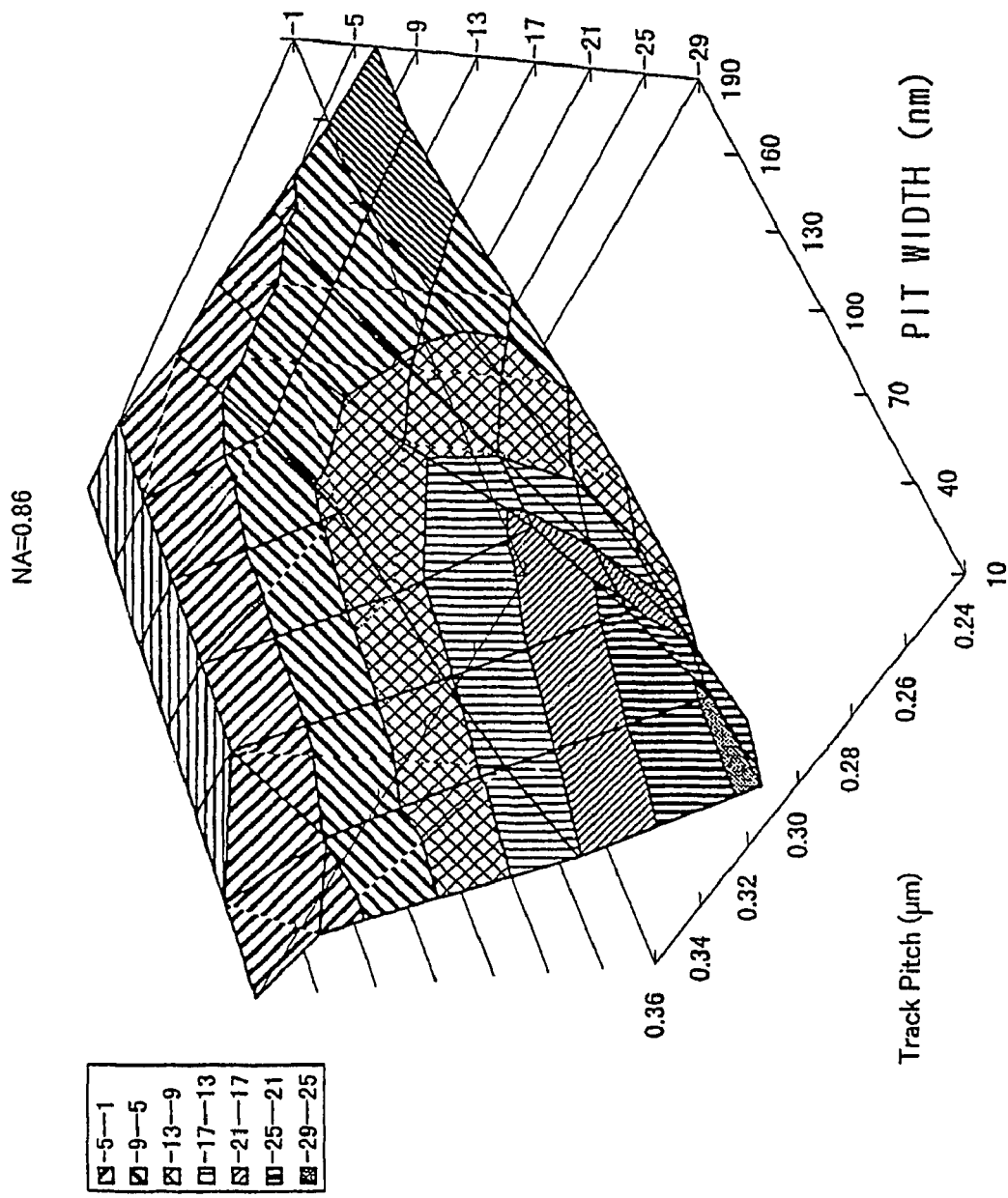
FIG. 13 is a three-dimensional graph showing a change of a value of crosstalk-signal-amplitude/main-signal-amplitude when the numerical aperture is respectively given 0.86 in the case of a product of track pitch TP and shortest pit length Tmin of 0.194 (λ/NA)².
Figure 14:
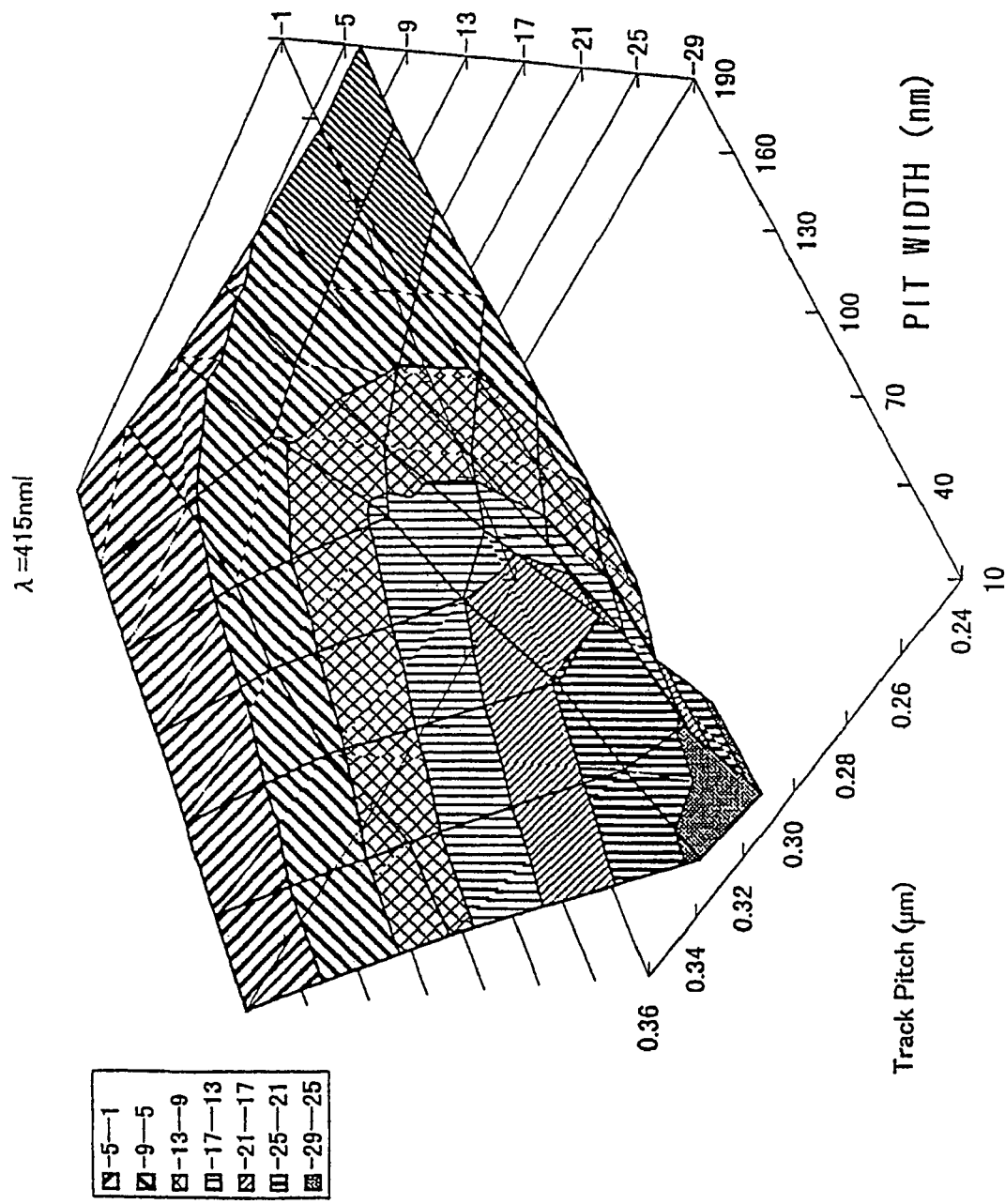
FIG. 14 is a three-dimensional graph showing a change of a value of crosstalk-signal-amplitude/main-signal-amplitude when the light beam wavelength is respectively given 415 nm in the case of a product of track pitch TP and shortest pit length Tmin of 0.194 (λ/NA)².
Figure 15:
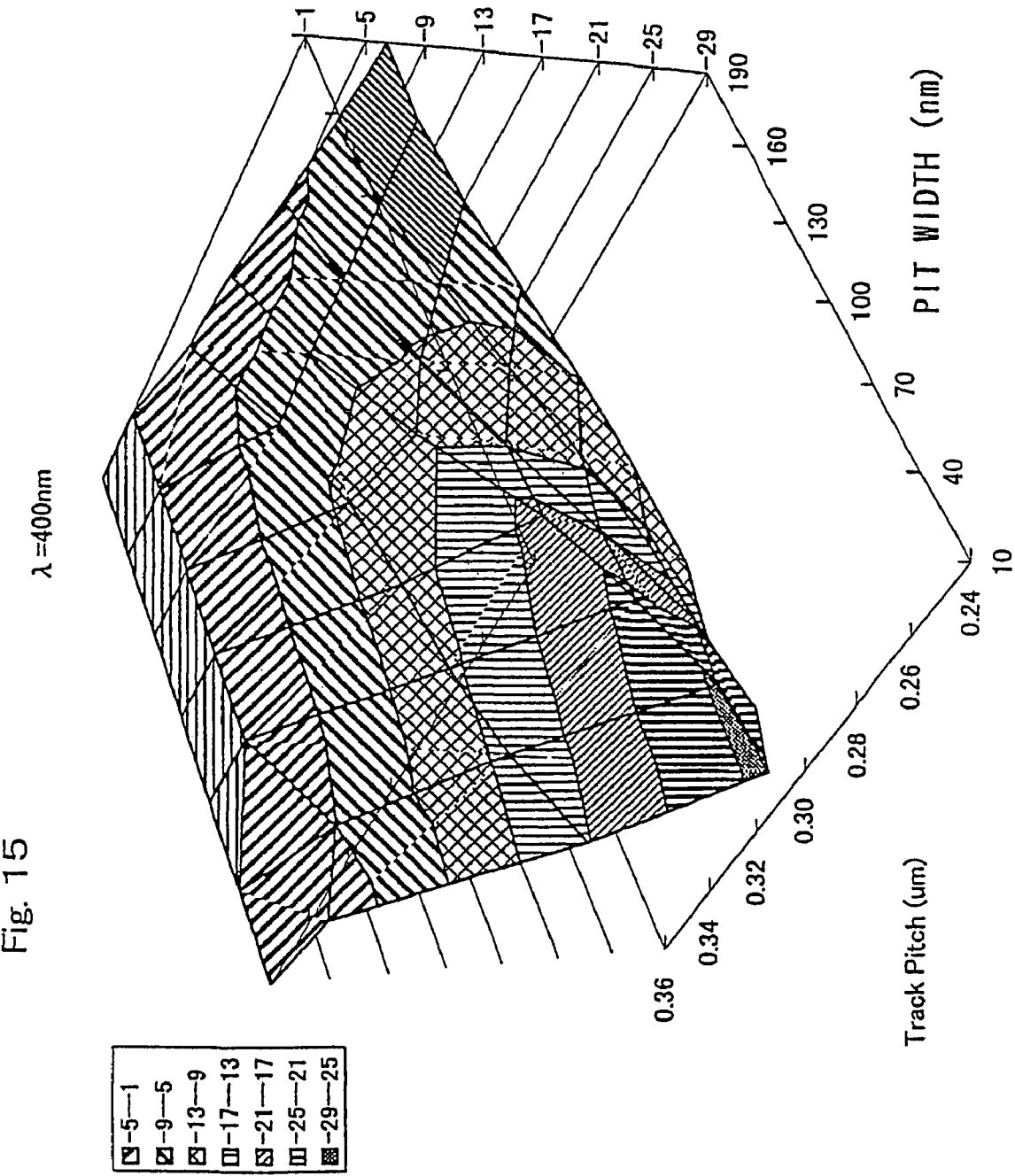
FIG. 15 is a three-dimensional graph showing a change of a value of crosstalk-signal-amplitude/main-signal-amplitude when the light beam wavelength is respectively given 400 nm in the case of a product of track pitch TP and shortest pit length Tmin of 0.194 (λ/NA)².
Figure 16:
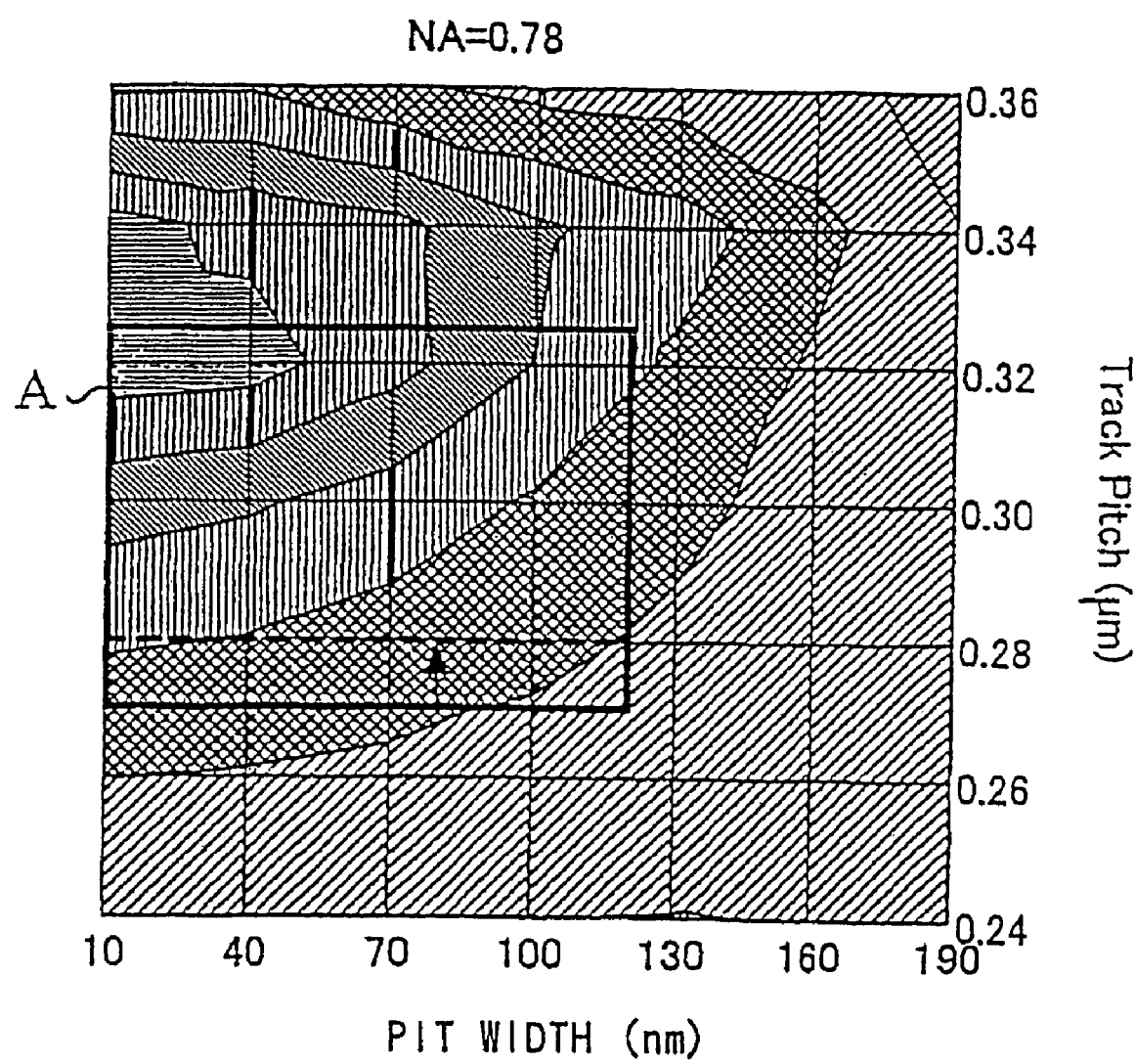
FIGS. 16 to 19 are two-dimensional graphs corresponding to FIGS. 12 to 15 respectively
Figure 17:
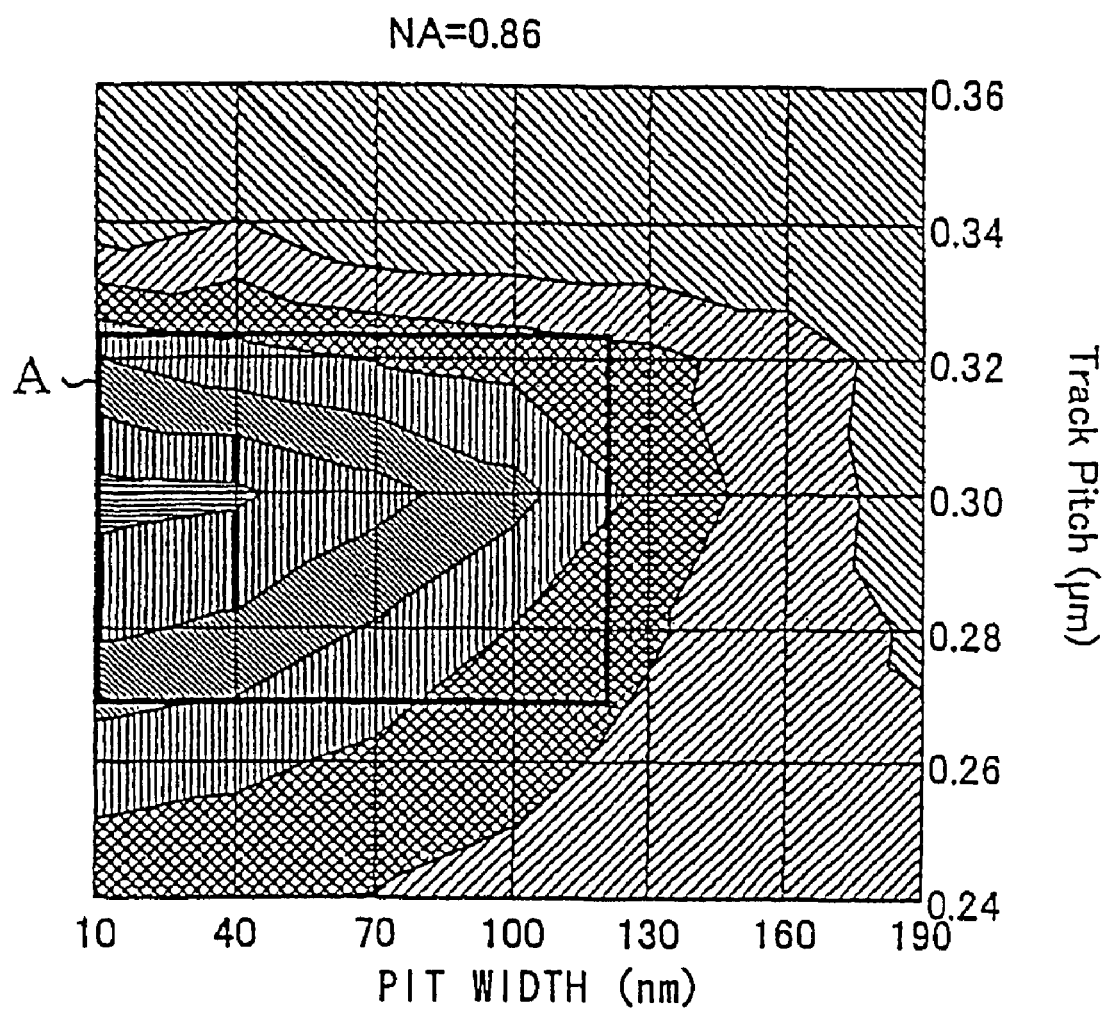
Figure 18:
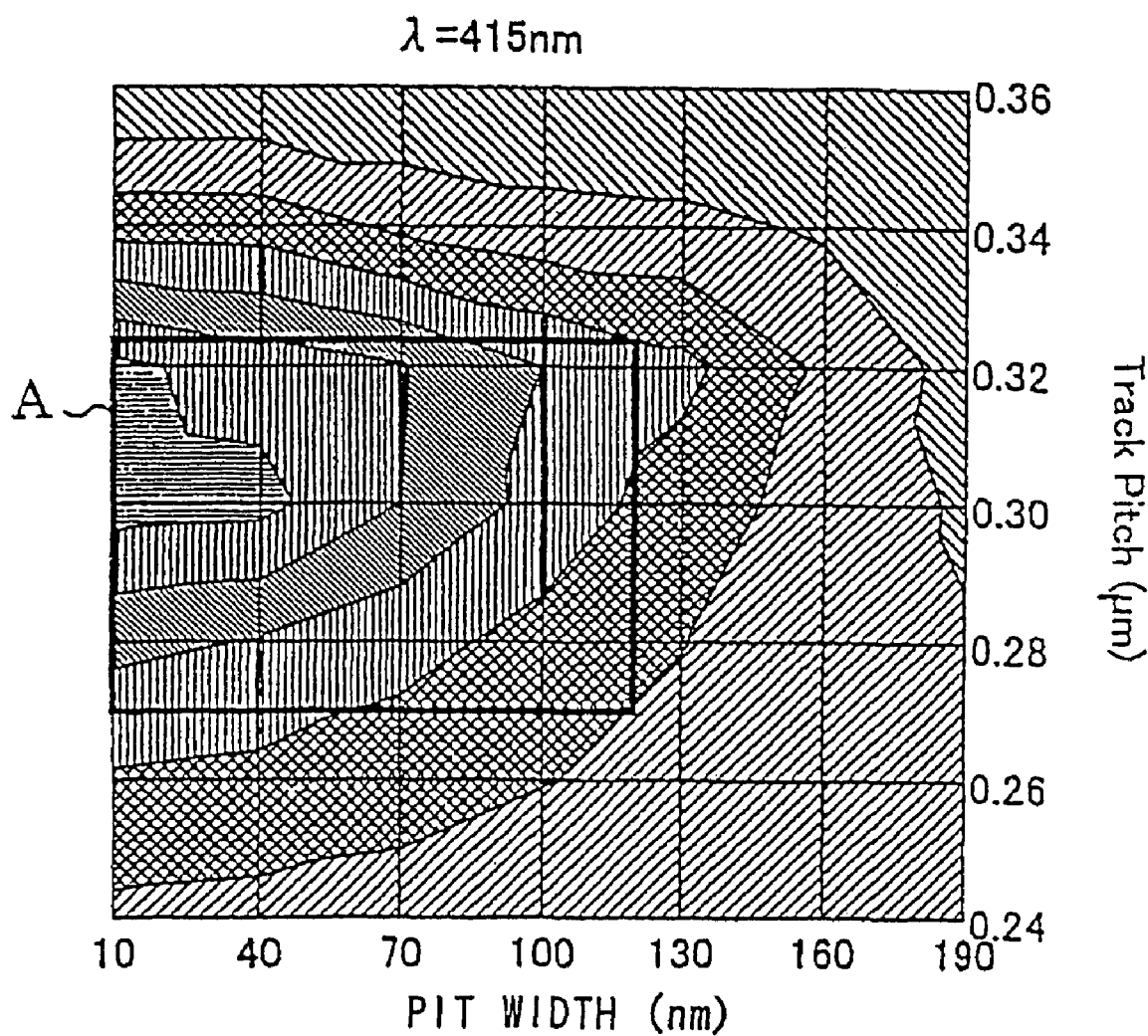
Figure 19:
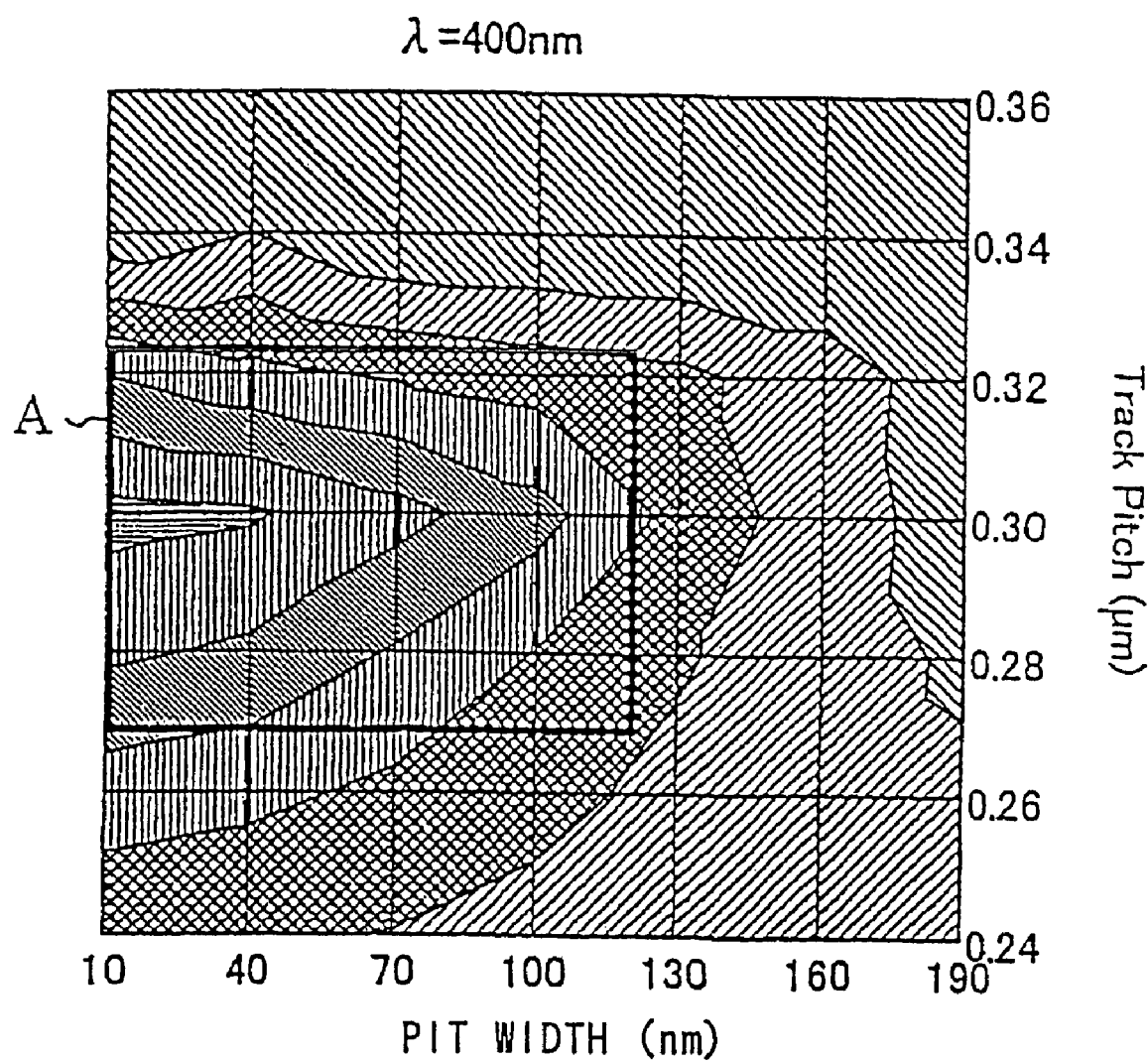

FIG. 12 and FIG. 13 show three-dimensional graphs of results of simulation for numerical apertures NA of 0.78 and 0.86, i.e. (NA, λ)=(0.78, 405 nm) and (NA, λ)=(0.86, 405 nm). Meanwhile, FIG. 14 and FIG. 15 show three-dimensional graphs of results of simulation for light beam wavelength λ of 415 nm and. 400 nm, i.e. (NA, λ)=(0.85, 415 nm) and (NA, λ)=(0.85, 400 nm). As apparent from these three-dimensional graphs, it can be seen that the distribution in the ranges of track pitch and pit width that is low value in crosstalk-signal-amplitude/main-signal-amplitude is nearly satisfied even if the numerical aperture NA and light beam wavelength λ changes. Similarly, as apparent from the contour-line graphs of FIGS. 16 to 19 respectively corresponding to FIGS. 12 to 15, it can be seen that, particularly when given NA=0.78 shown in FIG. 16, there is a need to narrow the lower limit of the track pitch from 0.27 μm to 0.28 μm. It can be seen that, in other points than that, there are no problems in the ranges of track pitch and pit width.

The following is to be understood by summarizing the above results.

In a disc system using conditions of an NA selected form 0.78 to 0.86 and a wavelength λ selected form 400 to 415 nm in a range of TP×Tmin of 0.194 $(\lambda/NA)^2$ to 0.264 $(\lambda/NA)^2$, the crosstalk and inter-symbol interference can be suppressed to such a small extent that there is no practical problem by providing a range of a track pitch of 0.280 to 0.325 μm and a range of a pit width of 120 nm or smaller.

On the other hand, laser beam recorders (hereinafter abbreviated as LBR) have been used for rendering pits in the manufacture of exclusive reproducing optical discs. However, for LBRs, rendering is limited only for the pits having nearly a pit width=200 nm.

However, the use of EBR makes possible to realize the above pit width. The pit made by use of EBR is considerably narrower in pit slant portion than the pit made by LBR. It is however impossible to exactly make the upper width and the lower width (bottom width) of the pit matched as in the model used in the above consideration.

Figure 20:
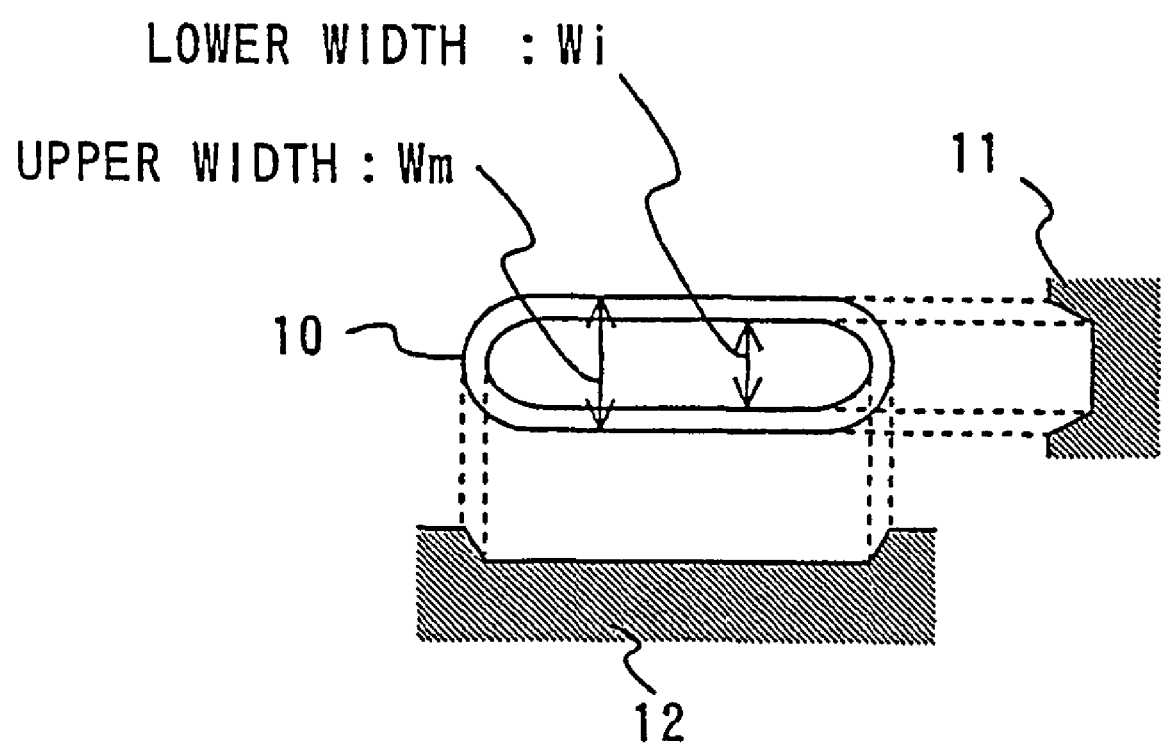
FIG. 20 is a typical view for explaining a pit form on the optical disc of an embodiment of the invention.

Accordingly, consideration has been made on the effect of narrowing the pit lower width when the pit upper width is fixed. FIG. 20 is a figure for explaining a pit form in the optical disc of the invention. In this case, the pit 10 has a peripheral edge made as a descending-gradient slant and a bottom nearly flat. Numeral 11 is a section of the pit 10 in a radial direction of an optical disc (track width direction), 12 is a section in a circumferential direction of the optical disc (track direction), Wm is a length of an upper opening of the pit 10 in a track width direction (upper width), and Wi is a length of a bottom of the pit 10 in a track width direction (lower width). Giving (NA, λ)=(0.85, 405 nm) and TP×Tmin=0.194 $(\lambda/NA)^2$, the pit lower width Wi was changed more than zero to 100 nm by fixing the pit upper width Wm at 100 μm as shown in FIG. 20. To this optical disc, an optical disc having a track pitch=0.30 μm and shortest pit length=0.147 μm corresponds.

Figure 21:
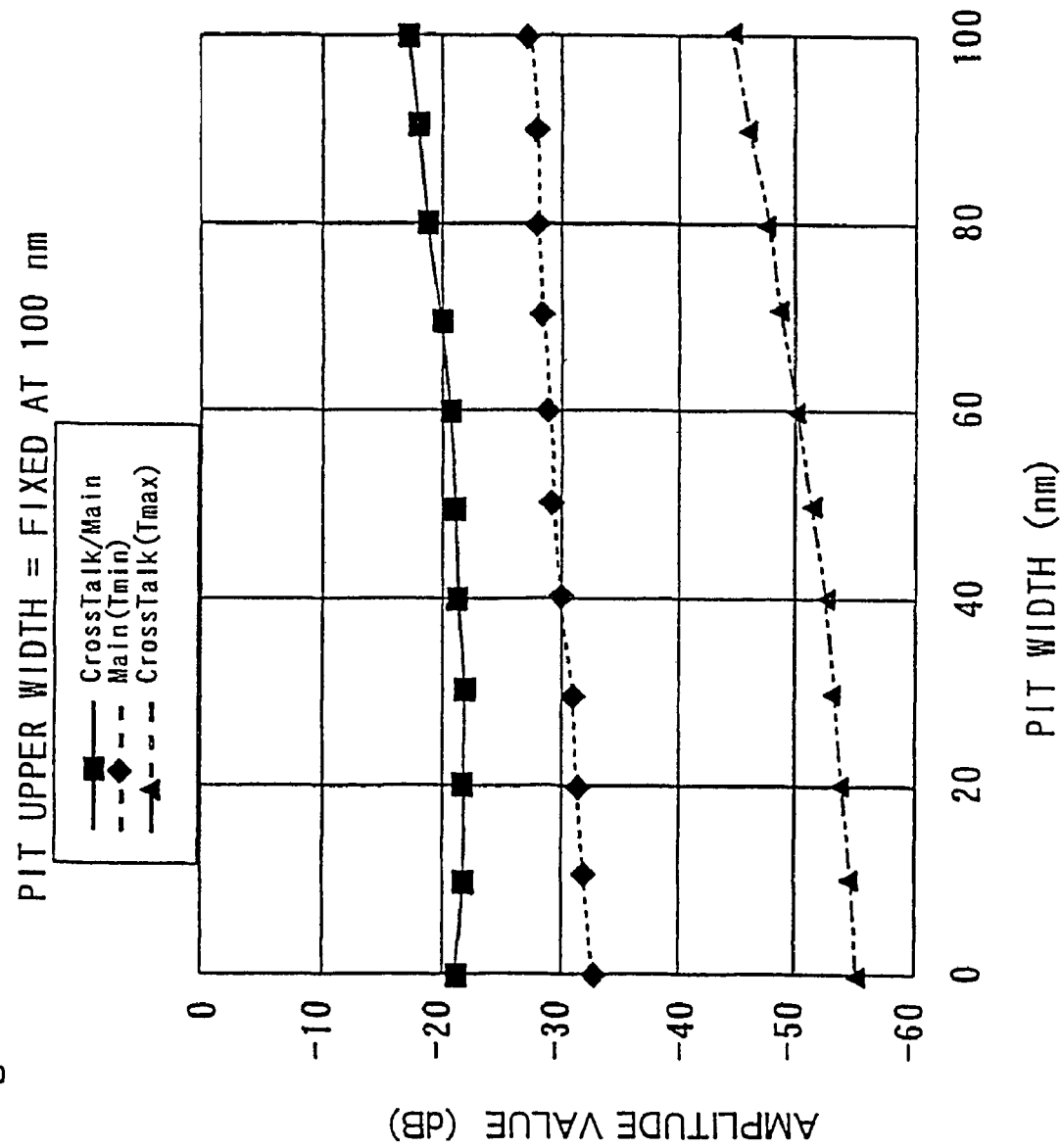
FIG. 21 is a graph showing a change of a main signal amplitude Main (Tmin), crosstalk signal amplitude Cross Talk (Tmax) and crosstalk-signal-amplitude/main-signal-amplitude (CrossTalk/Main) where a pit lower width is changed from 0 to 100 nm with a pit upper width fixed at 100 nm in the optical disc of an embodiment of the invention.

This simulation result is shown in the graph of FIG. 21. As understood from the figure, if the pit upper width is fixed, then the main signal amplitude Main (Tmin) and crosstalk signal amplitude Cross Talk (Tmax) similarly changes. Accordingly, it can be understood that there is almost no change in the value of crosstalk-signal-amplitude/main-signal-amplitude (Cross-Talk/Main) even if the pit lower width is narrowed.

That is, it is understood that the above ranges of track pitch and pit width are effective without relying upon the value of the pit lower width.

However, if the pit lower width is excessively narrowed, variation occurs during pit rendering in the manufacture of exclusive reproducing optical discs thereby making difficult to obtain a well-reproducible pit form. That is, in making a master disc, the inclination angle of a recess side surface is difficult to control because of change due to a resist material kind, film thick distribution and developing condition, thereby causing a case of not forming a bottom of a pit recess.

The reason why a pit is difficult to stably form if the pit lower width is narrowed is described in detail below.

In optical disc mastering due to EBR, resist is applied to a master disc. This is rotated to conduct exposure by illuminating an electron beam to the master disc. Thereafter, the resist is developed thereby forming recesses corresponding to pits in an exposed area.

Figure 22:
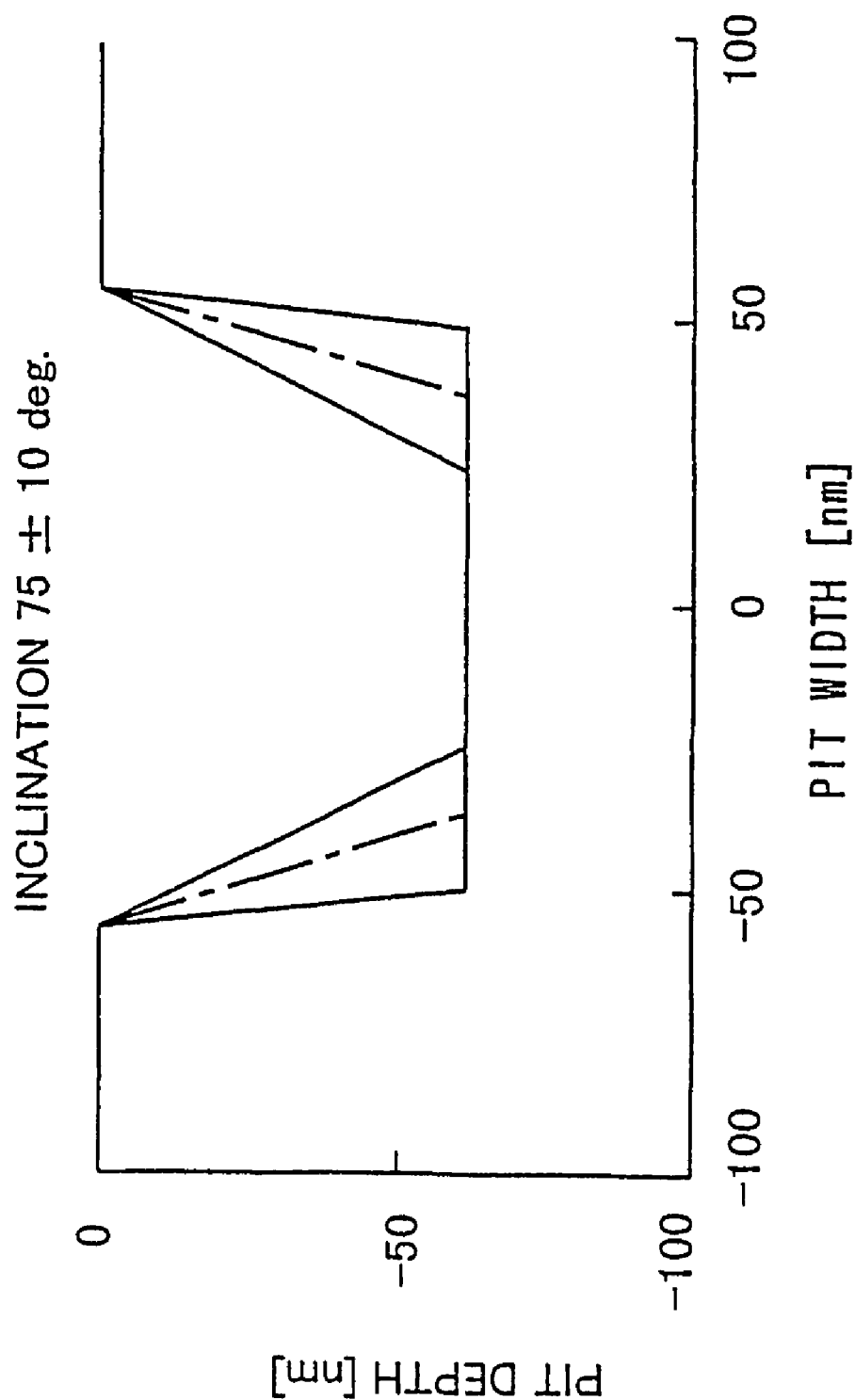
FIGS. 22 to 24 are typical sectional views each showing a master disc for the optical disc of the embodiment of the invention.
Figure 23:
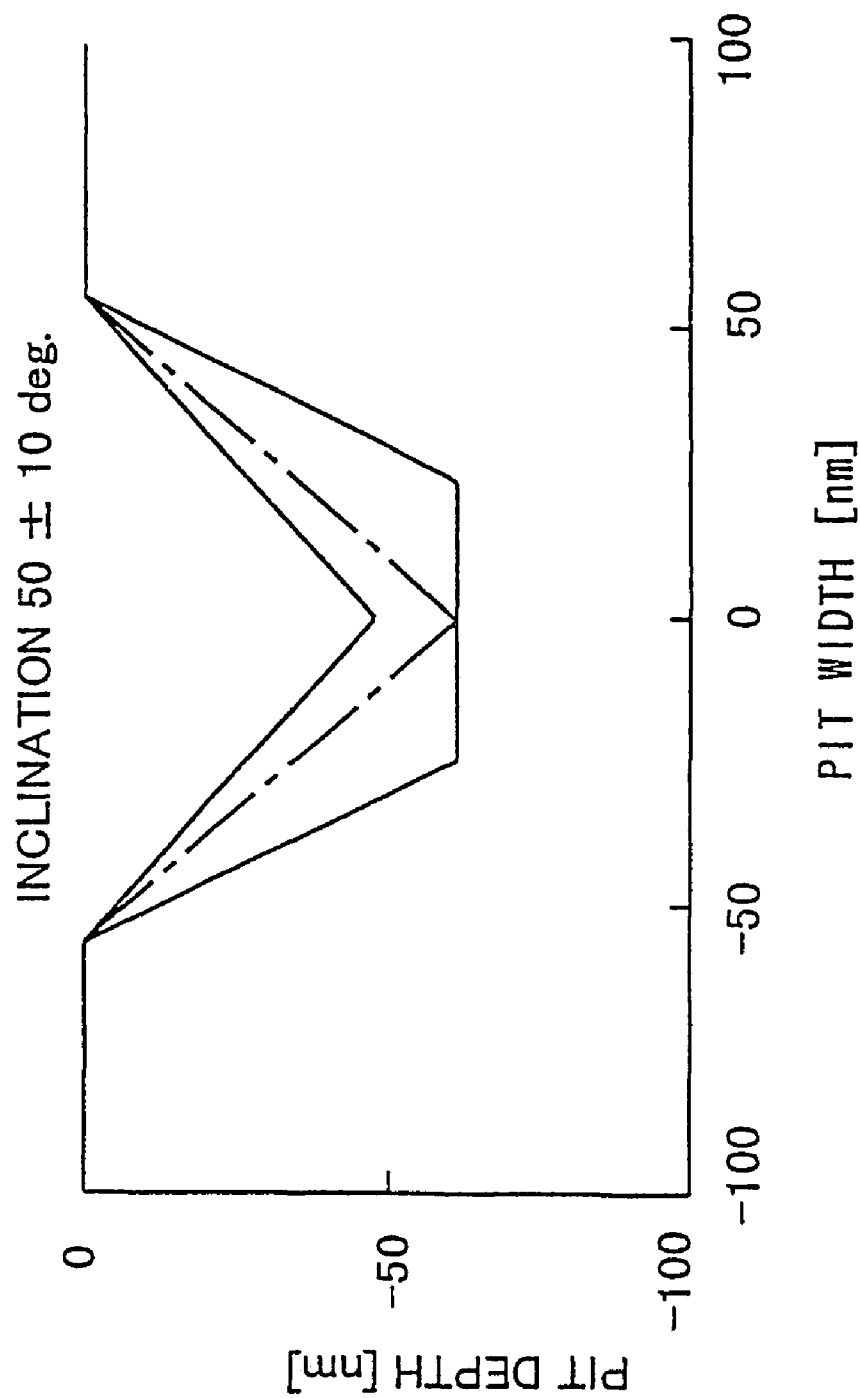

As shown in a typical view of a master disc section of FIGS. 22 and 23, a pit recess is usually formed in the depth direction with an angle. This angle varies depending not only upon a resist kind but also upon an exposure intensity distribution, developing process and the like, and hence is difficult to exactly control. Variation unavoidably occurs in a certain extent.

FIG. 22 and FIG. 23 each represent a case the recess side surface changes in inclination provided that the pit depth is 64 nm and the pit upper width is 110 nm.

FIG. 22 shows a manner that the side-surface inclination has changed by ±10 degrees from a center of an angle of 75 degrees. The pit lower width varies depending on the inclination, i.e. 76 nm at a side-surface inclination of 75 degrees, 50 nm at 65 degrees and 99 nm at 85 degrees.

Meanwhile, FIG. 23 shows a manner that the side-surface inclination has changed by ±10 degrees from an angle 50 degrees as a center. The pit lower width is 2.6 nm hence providing nearly a triangular section, when the side-surface inclination angle is 50 degrees. Accordingly, the pit lower width is 36 nm when the inclination angle is 60 degrees. However, in the case of 40 degrees, the pit is not formed to a required depth of 64 nm (λ/6.25). As apparent from this discussion, if the pit lower width is excessively narrowed in the manufacture of a master disc, it is difficult to stably make pits with a required depth.

Figure 24:
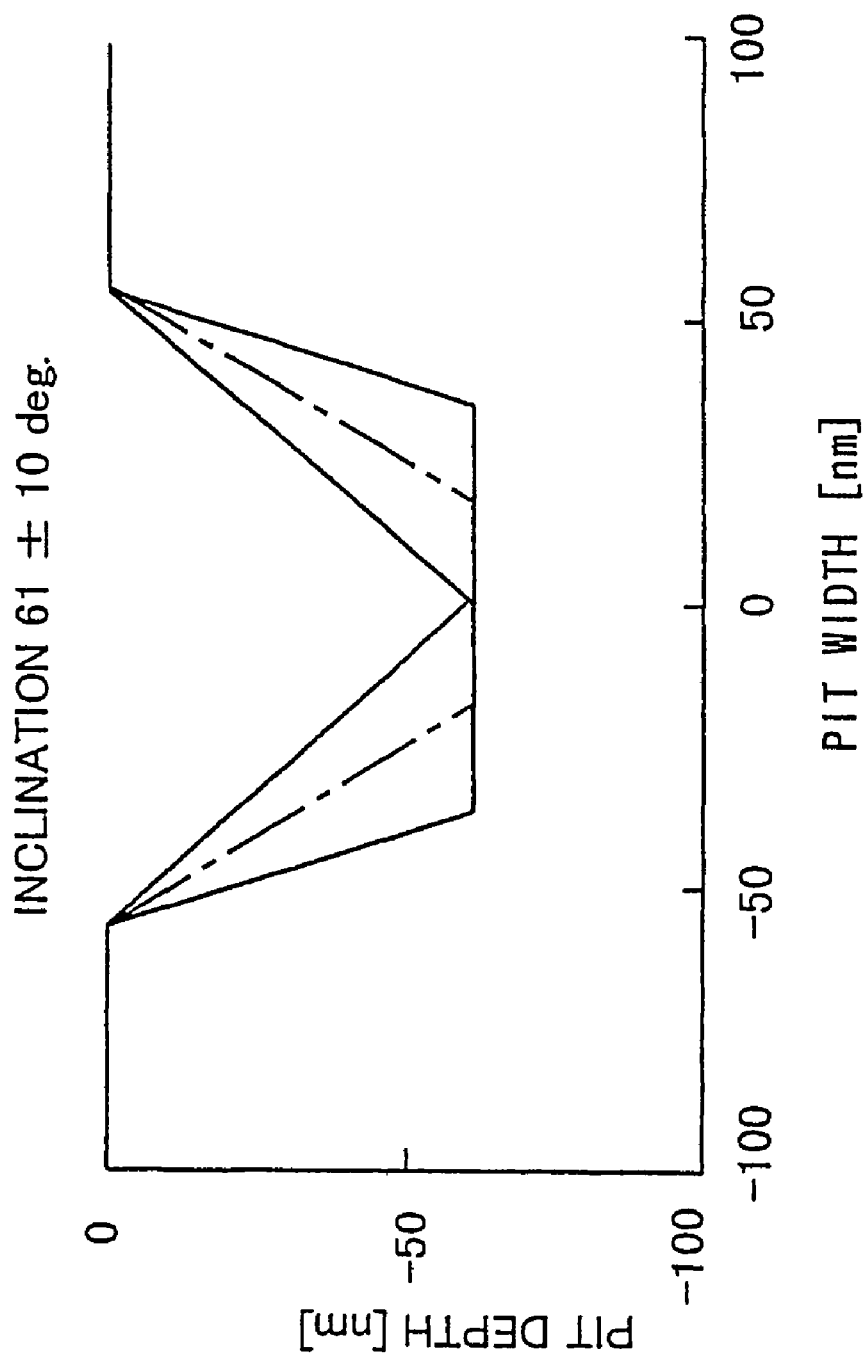

The process of inject-molding a resin using a stumper made from the master disc becomes difficult as the pit width becomes narrower. As a result of examining the limitation through experiment, the minimum width was 40 nm for a pit depth of 60 nm (λ/6.66) and inclination angle of approximately 90 degrees. Accordingly, it is to be considered that forming is possible where the pit lower width is 40 nm or greater and the pit upper width is greater than that. On the basis of this discussion, consideration is made on a master-disc section on the assumption of a pit lower width of 40 nm. In this case it is 61 degrees. The assumption that the inclination deviates ±10 degrees from that point as a center gives FIG. 24. In this manner, in the case of the pit lower width of 40 nm, there is no possibility that the recess bottom be made shallow even if the inclination is moderated by 10 degrees due to the variation in manufacture.

From a result of repetition of the above experiment, it was found that 40 nm or greater is required for a pit lower width of an optical disc.

The following is found by summarizing all the above considerations.

In a disc system using conditions of an NA selected form 0.78 to 0.86 and a wavelength λ selected form 400 to 415 nm in a range of TP×Tmin of 0.194 $(\lambda/NA)^2$ to 0.264 $(\lambda/NA)^2$, it is possible to stably manufacture exclusive reproducing optical discs having a crosstalk and inter-symbol interference suppressed to such a small extent there is no practical problem by providing a track pitch of 0.280 to 0.325 μm and a pit width of 120 nm or smaller and a pit lower width of 40 nm or greater. The pit width is a pit maximum width.

Figure 25:
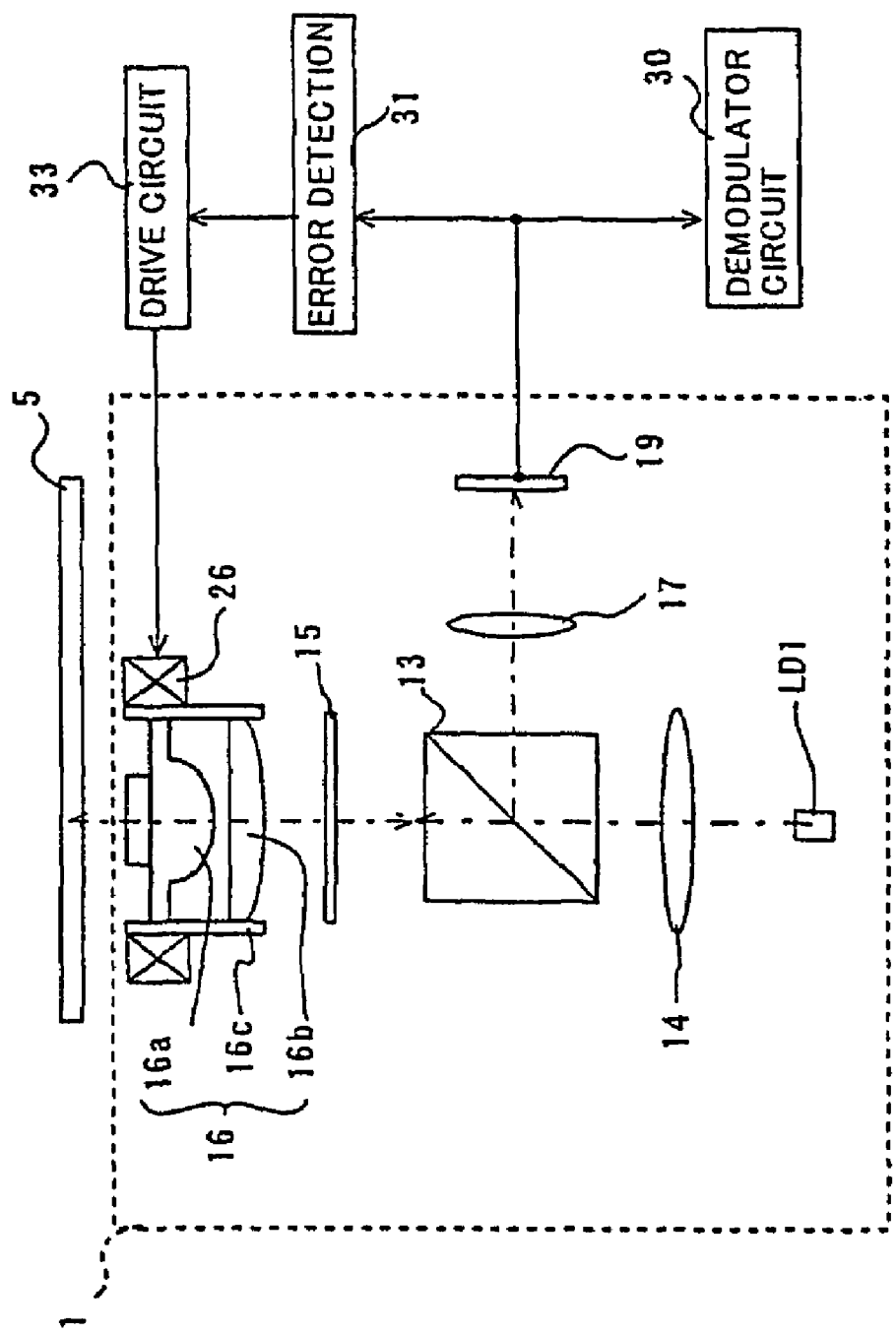
FIG. 25 is a model on a reproducing optical system of an optical-disc information reproducing apparatus, which is a typical view showing a schematic structure of an information recording/reproducing apparatus having an optical pickup device as an example of an embodiment.

FIG. 25 is a model on a reproducing optical system of an optical disc information reproducing apparatus according to the invention, showing a schematic structure of an optical recording/reproducing apparatus provided with an optical pickup device as an example of an embodiment. An optical pickup has a blue semiconductor laser LD1 for emitting a short wavelength blue portion having a wavelength of nearly 400 nm to 415 nm, preferably around 405 nm.

The optical pickup has a polarization beam splitter 13, a collimator lens 14, a ¼-wavelength plate 15 and two groups of lens units 16. By the above light-illumination optical system, the laser beam from the semiconductor laser LD1 is turned into a collimating beam by the collimator lens 14. The beam is then passed through the polarization beam splitter 13 and transmitted through the ¼-wavelength plate 15, and focused by the objective lens unit 16 toward the optical disc 5 placed around the focal point thereof. Thus, a light spot is formed on a pit train of an information recording surface of the optical disc 5.

In addition to the above light illuminating optical system, the optical pickup further has a light-detecting optical system such as a detecting lens 17. The objective lens unit 16, the ¼-wavelength plate 15 and the polarization beam splitter 13 are utilized also in the light-detecting optical system. The reflection light from the optical disc 5 is focused by the objective lens unit 16 and passed through the ¼-wavelength plate 15, then being directed toward a detecting focus lens 17 by the polarization beam splitter 13. The focused light collected by the detecting lens 17 is passed through an astigmatism generating element (not shown), e.g. a cylindrical lens or a multi-lens, to form a light spot at or around a center of a light-receiving surface 19 of a photodetector.

Meanwhile, the light-receiving surface 19 of the photodetector is connected to a demodulator 30 and error detecting circuit 31. The error detecting circuit 31 is connected to a drive circuit 33 for driving a mechanism including an actuator 26 for tracking control and focus control of the objective lens unit.

The photodetector supplies an electric signal dependent upon a light-spot image formed at or around the center of the light-receiving surface 19 to the demodulator circuit 30 and error detecting circuit 31. The demodulator circuit 30 generates a recording signal on the basis of the electric signal. The error detecting circuit 31 generates a focus error signal, a tracking error signal and other servo signals on the basis of the electric signal, and supplied each drive signal to each actuator through a drive circuit 33 for the actuator. These drives under servo control the objective lens unit 16 and the like in accordance with each drive signal.

Next, the structure of an optical disc according to the invention is described. A circular substrate of a light-transmissive resin, such as polycarbonate or acrylic resin, having emboss pits defined as above is deposited with a reflection film of aluminum or the like on one surface thereof, on which a light-transmissive layer is formed with a thickness of 0.1 mm. Reading out is at the light-transmissive side. Meanwhile, a double-sided disc is available by opposing and bonding together the substrates through adhesive layer of a thermo-setting type or the like. The optical disc has a clamping bore opened in the center, around which a clamping zone is provided.

INDUSTRIAL APPLICABLITY

As described above, the optical disc according to the invention has a pit form optimal in track pitch and width to reduce the crosstalk-signal-amplitude/main-signal-amplitude representative of superiority and inferiority in reproduced RF signal characteristic to −9 dB or lower, thus securing a sufficient system margin and drastically enhancing information recording density as compared to the DVD.

The invention claimed is:

1. An optical disc, comprising an information recording layer having a record of information as a pit train with a predetermined track pitch and a light-transmissive layer formed on said information recording layer so that the information is reproduced by a beam of light illuminated through said light-transmissive layer to said information recording layer by an objective lens,
   wherein a relationship of $0.194\ (\lambda/NA)^2 \leq TP \times Tmin \leq 0.264\ (\lambda/NA)^2$ is satisfied, provided that the track pitch is TP, a pit shortest length is Tmin, a wavelength of the light beam is $\lambda$ and a numerical aperture of said objective lens is NA, and
   wherein a pit upper width is 120 nm or smaller in a range of a track pitch of 0.280 to 0.325 μm.

2. An optical disc according to claim 1, wherein a bottom width of the pit is 40 nm or greater.

3. An optical disc according to claim 1 or 2, wherein the light beam has a wavelength $\lambda$ of 400 to 415 nm and said objective lens has a numerical aperature NA of from 0.78 to 0.86.

4. An information reproducing apparatus, comprising:
   means for rotatably supporting an optical disc having an information recording layer having a record of information as a pit train with a predetermined track pitch and a light-transmissive layer formed on said information recording layer; a light source for emitting a beam of light; an objective lens for focusing the light beam toward said information recording layer through said light-transmissive layer of said optical disc; an illuminating optical system for guiding the light beam to said objective lens; and a detecting optical system including light detecting means to guide a reflection light from said information recording layer to said light detecting means through said objective lens; means for reproducing information recorded on said optical disc on the basis of an output from said light detecting means,
   wherein said optical disc is satisfied by a relationship of $0.194\ (\lambda/NA)^2 \leq TP \times Tmin \leq 0.264\ (\lambda/NA)^2$, provided that the track pitch is TP, a pit shortest length is Tmin, a wavelength of the light beam is $\lambda$ and a numerical aperature of said objective lens is NA, and
   wherein a pit upper width is 120 nm or smaller in a range of a track pitch of 0.280 to 0.325 μm.

5. An information reproducing apparatus according to claim 4, wherein a bottom width of the pit is 40 nm or greater.

6. An information recording apparatus according to claim 4 or 5, wherein said light source is a blue semiconductor laser having a wavelength $\lambda$ of 400 to 415 nm, and said objective lens has a numerical aperture NA of from 0.78 to 0.86.

* * * * *